(12) United States Patent
Ajito

(10) Patent No.: US 10,187,594 B2
(45) Date of Patent: Jan. 22, 2019

(54) IMAGE PICKUP APPARATUS, IMAGE PICKUP METHOD, AND NON-TRANSITORY COMPUTER-READABLE MEDIUM STORING COMPUTER PROGRAM

(71) Applicant: OLYMPUS CORPORATION, Hachioji-shi, Tokyo (JP)

(72) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/478,545

(22) Filed: Apr. 4, 2017

(65) Prior Publication Data

US 2017/0208264 A1 Jul. 20, 2017

Related U.S. Application Data

(63) Continuation of application No. PCT/JP2015/059177, filed on Mar. 25, 2015.

(30) Foreign Application Priority Data

Nov. 4, 2014 (JP) ................................. 2014-224417

(51) Int. Cl.
- *H04N 5/349* (2011.01)
- *H04N 5/353* (2011.01)
- *G06T 3/40* (2006.01)

(52) U.S. Cl.
CPC ........... *H04N 5/349* (2013.01); *G06T 3/4069* (2013.01); *H04N 5/353* (2013.01)

(58) Field of Classification Search
CPC ....... H04N 5/349; H04N 5/353; G06T 3/4069
See application file for complete search history.

(56) References Cited

U.S. PATENT DOCUMENTS

| 6,236,430 B1 * | 5/2001 | Suzuki | H04N 3/1587 348/219.1 |
| 6,243,136 B1 * | 6/2001 | Sasaki | H04N 5/349 348/230.1 |

(Continued)

FOREIGN PATENT DOCUMENTS

| JP | 06-225317 | 8/1994 |
| JP | 10-191135 | 7/1998 |

(Continued)

OTHER PUBLICATIONS

International Search Report to corresponding International Application No. PCT/JP2015/059177 dated Jun. 15, 2016 (2 pgs.), with translation (2 pgs.).

(Continued)

*Primary Examiner* — Nhan T Tran
(74) *Attorney, Agent, or Firm* — John C. Pokotylo; Pokotylo Patent Services

(57) ABSTRACT

An image pickup apparatus a includes a VCM configured to move relative positions of an image sensor and a light beam such that a movement amount of a frame period is a non-integer multiple of a pixel pitch, a microcomputer configured to cause the image sensor to perform exposures a plurality of times during the movement of the relative positions and acquire a plurality of image data, and a combination processing section configured to generate high-resolution combined image data from the acquired plurality of image data. The VCM sets the movement of the relative positions during the exposures in a same moving direction and a same movement amount in each of the exposures of the plurality of times.

9 Claims, 19 Drawing Sheets

(56) References Cited

U.S. PATENT DOCUMENTS

| | | | |
|---|---|---|---|
| 6,670,986 B1 * | 12/2003 | Ben Shoshan | H04N 5/349 348/219.1 |
| 6,678,000 B1 * | 1/2004 | Sakata | H04N 5/349 348/218.1 |
| 6,686,956 B1 | 2/2004 | Prakash | |
| 2002/0097324 A1 * | 7/2002 | Onuki | H04N 5/2259 348/208.99 |
| 2002/0126210 A1 * | 9/2002 | Shinohara | H04N 5/349 348/219.1 |
| 2007/0296829 A1 | 12/2007 | Nakamura | |
| 2014/0125828 A1 | 5/2014 | Takeuchi | |

FOREIGN PATENT DOCUMENTS

| | | | |
|---|---|---|---|
| JP | 2001-136541 | 5/2001 | |
| JP | 2002118755 A * | 4/2002 | H04N 1/409 |
| JP | 2006-140885 | 6/2006 | |
| JP | 2006-345147 | 12/2006 | |

OTHER PUBLICATIONS

Extended European Search Report to counterpart EP Application No. 15856809.7, dated Jun. 7, 2018 (9 pgs.).

* cited by examiner

FIG. 5

| Gr⁷(x-2, y-2) | | Gr¹(x, y) | |
|---|---|---|---|
| | Gr⁸(x-2, y-2) | | Gr²(x, y) |
| Gr³(x-1, y) | | Gr⁵(x-1, y-1) | |
| | Gr⁴(x-1, y) | | Gr⁶(x-1, y-1) |

FIG. 6

| Gb⁵(x-1, y-2) | | Gb³(x, y-1) | |
|---|---|---|---|
| | Gb⁶(x-1, y-2) | | Gb⁴(x, y-1) |
| Gb¹(x, y) | | Gb⁷(x-1, y-2) | |
| | Gb²(x, y) | | Gb⁸(x-1, y-2) |

FIG. 7

| $B^3(x-1, y-1)$ |                 | $B^5(x-1, y-2)$ |                 |
|                 | $B^4(x-1, y-1)$ |                 | $B^6(x-1, y-2)$ |
| $B^7(x-2, y-2)$ |                 | $B^1(x, y)$     |                 |
|                 | $B^8(x-2, y-2)$ |                 | $B^2(x, y)$     |

IMAGE PICKUP APPARATUS, IMAGE PICKUP METHOD, AND NON-TRANSITORY COMPUTER-READABLE MEDIUM STORING COMPUTER PROGRAM

CROSS REFERENCE TO RELATED APPLICATION

This application is a continuation application of PCT/JP2015/059177 filed on Mar. 25, 2015 and claims benefit of Japanese Application No. 2014-224417 filed in Japan on Nov. 4, 2014, the entire contents of which are incorporated herein by this reference.

BACKGROUND OF THE INVENTION

1. Field of the Invention

The present invention relates to an image pickup apparatus, an image pickup method, and a non-transitory computer-readable medium storing a computer program for performing a pixel shift to generate high-resolution combined image data.

2. Description of the Related Art

There has been proposed a technique for combining a plurality of image data, which are acquired by performing a pixel shift with a movement amount that is a non-integer multiple of a pixel pitch, and generating high-resolution combined image data.

For example, Japanese Patent Application Laid-Open Publication No. H6-225317 describes a technique for shifting an image sensor of a Bayer array in a horizontal direction, a vertical direction, or an oblique direction by 0.5 pixel or one pixel at a time to perform four or eight times of photographing and combining obtained four or eight images to thereby generate an image having double resolution in the horizontal direction and the vertical direction.

Such a technique for combining images of a plurality of frames to obtain one high-resolution image is based on the premise that an object does not move while the images of the plurality of frames are photographed. Therefore, conventionally, photographing is performed in a procedure for, when exposure in one pixel shift position ends, performing capturing of an image, when the capturing of the image ends, performing a shift to a next pixel shift position (the pixel shift is referred to as "shift" as well), and, when the shift ends, starting next exposure. A photographing time required for the pixel shift photographing in this case is represented as follows:

(exposure time+image capturing time+pixel shift time)×number of photographed images

SUMMARY OF THE INVENTION

An image pickup apparatus according to a certain aspect of the present invention includes: an image sensor in which a plurality of pixels are two-dimensionally arrayed at a predetermined pixel pitch; a pixel-shift driving mechanism configured to move relative positions of the image sensor and a light beam, which is received by the image sensor, in a direction of the two-dimensional array to set a movement amount of a frame period to a non-integer multiple of the pixel pitch; and a processor configured of hardware, the processor being configured to function as: an image-pickup control section configured to cause the image sensor to perform exposures a plurality of times during the movement of the relative positions and acquire image data of a plurality of frames; and an image combining section configured to combine the image data of the plurality of frames acquired by the image-pickup control section to generate combined image data having higher resolution than the image data obtained from the image sensor. The pixel-shift driving mechanism sets the movement of the relative positions during the exposures in a same moving direction and a same movement amount in each of the exposures of the plurality of times.

An image pickup method according to a certain aspect of the present invention includes: moving relative positions of an image sensor, in which a plurality of pixels are two-dimensionally arrayed at a predetermined pixel pitch, and a light beam, which is received by the image sensor, in a direction of the two-dimensional array to set a movement amount of a frame period to a non-integer multiple of the pixel pitch; causing the image sensor to perform exposures a plurality of times during the movement of the relative positions and acquiring image data of a plurality of frames; and combining the image data of the plurality of frames to generate combined image data having higher resolution than the image data obtained from the image sensor. The movement of the relative positions during the exposures is set in a same moving direction and a same movement amount in each of the exposures of the plurality of times.

In a non-transitory computer-readable medium storing a computer program according to a certain aspect of the present invention, the computer program causes a computer to execute processing for: moving relative positions of an image sensor, in which a plurality of pixels are two-dimensionally arrayed at a predetermined pixel pitch, and a light beam, which is received by the image sensor, in a direction of the two-dimensional array to set a movement amount of a frame period to a non-integer multiple of the pixel pitch; causing the image sensor to perform exposures a plurality of times during the movement of the relative positions and acquiring image data of a plurality of frames; and combining the image data of the plurality of frames to generate combined image data having higher resolution than the image data obtained from the image sensor. The movement of the relative positions during the is set in a same moving direction and a same movement amount in each of the exposures the plurality of times.

BRIEF DESCRIPTION OF THE DRAWINGS

FIG. 5 is a diagram showing Gr pixel arrangement obtained by the pixel arranging section from the eight Bayer images of the pixel arrangement shown in FIG. 3 in the first embodiment;

FIG. 6 is a diagram showing Gb pixel arrangement obtained by the pixel arranging section from the eight Bayer images of the pixel arrangement shown in FIG. 3 in the first embodiment;

FIG. 7 is a diagram showing B pixel arrangement obtained by the pixel arranging section from the eight Bayer images of the pixel arrangement shown in FIG. 3 in the first embodiment;

DETAILED DESCRIPTION OF THE PREFERRED EMBODIMENT(S)

Embodiments of the present invention are explained below with reference to the drawings.

[First Embodiment]

Figure 1:
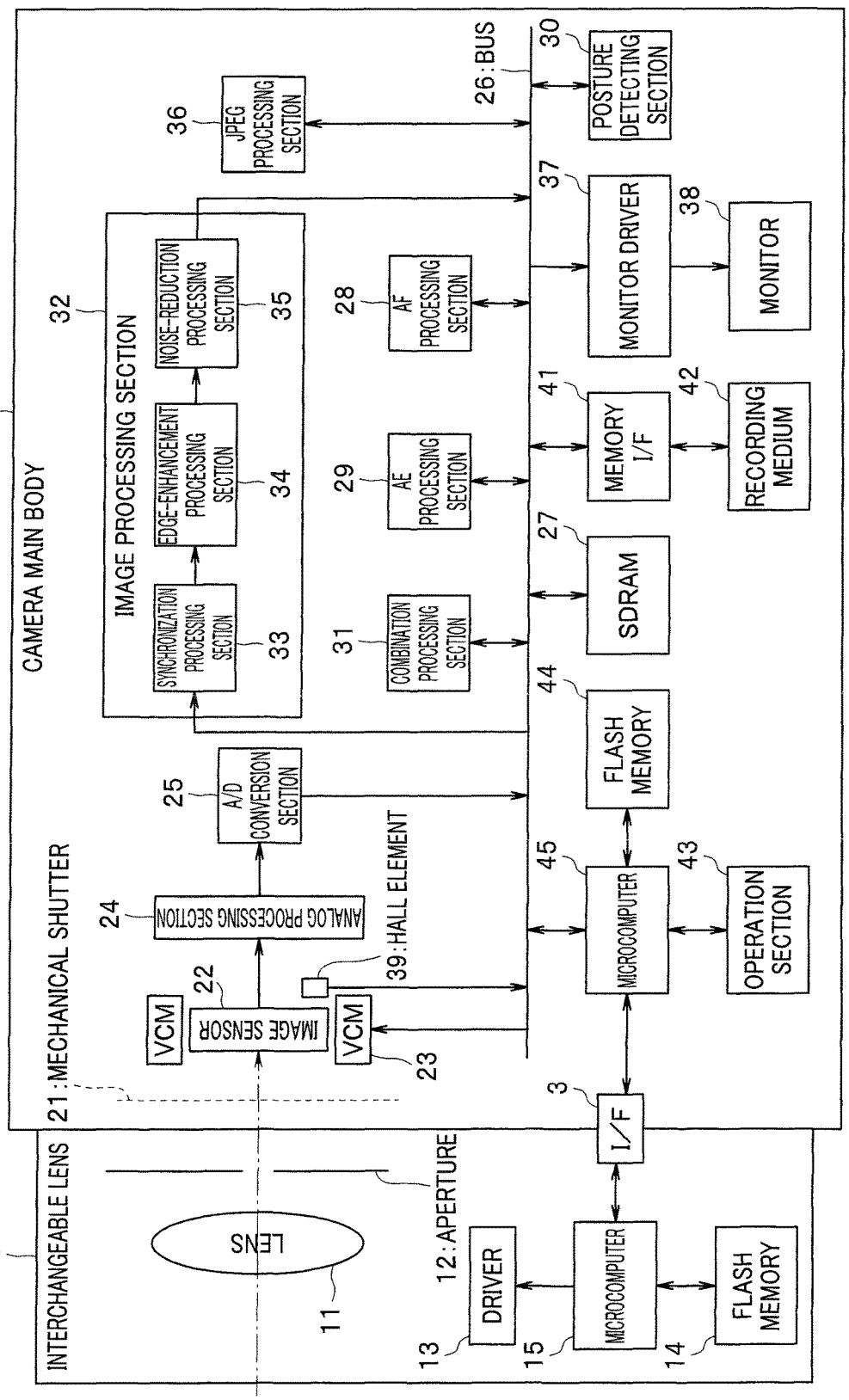
FIG. 1 is a block diagram showing a configuration of a digital camera in a first embodiment of the present invention.

FIG. 1 to FIG. 20 show a first embodiment of the present invention. FIG. 1 is a block diagram showing a configuration of a digital camera. In the present embodiment, an image pickup apparatus is applied to the digital camera.

The digital camera is configured by connecting an interchangeable lens 1 and a camera main body 2 to be capable of communicating via an interface (I/F) 3.

The interchangeable lens 1 is detachably mounted on the camera main body 2 via, for example, a lens mount. The interface 3 is configured by electric contacts formed in the lens mount (an electric contact provided on the interchangeable lens 1 side and an electric contact provided on the camera main body 2 side) and the like. In this way, the interchangeable lens 1 can communicate with the camera main body 2 via the interface 3.

The interchangeable lens 1 includes a lens 11, an aperture 12, a driver 13, a flash memory 14, and a microcomputer 15.

The lens 11 is a photographing optical system for forming an optical image of an object on an image sensor 22 explained below of the camera main body 2.

The aperture 12 is an optical aperture configured to control a passing range of a light beam that passes through the lens 11.

The driver 13 drives the lens 11 and performs adjustment of a focus position and, when the lens 11 is an electric zoom lens or the like, also performs a change of a focal length on the basis of a command from the microcomputer 15. In addition, the driver 13 drives the aperture 12 to change an opening diameter on the basis of a command from the microcomputer 15. Brightness of the optical image of the object changes and magnitude of a blur and the like also change according to the driving of the aperture 12. Note that, when a plurality of image data is acquired while performing a pixel shift in a pixel shift super resolution photographing mode explained below, the aperture 12 is maintained without being driven from a point in time before a first image is acquired until a point in time after a last image is acquired.

The flash memory 14 is a storage medium configured to store processing programs executed by the microcomputer 15 and various kinds of information concerning the interchangeable lens 1.

The microcomputer 15 is a so-called lens-side computer and is connected to the driver 13, the flash memory 14, and the interface 3. The microcomputer 15 communicates with a microcomputer 45, which is a main body-side computer to be explained below, via the interface 3, receives a command from the microcomputer 45, performs readout/writing of the information stored in the flash memory 14, and controls the driver 13. Further, the microcomputer 15 transmits the various kinds of information concerning the interchangeable lens 1 to the microcomputer 45.

The interface 3 connects the microcomputer 15 of the interchangeable lens 1 and the microcomputer 45 of the camera main body 2 to be capable of bidirectionally communicating with each other.

The camera main body 2 includes a mechanical shutter 21, an image sensor 22, a voice coil motor (VCM) 23, an analog processing section 24, an analog/digital conversion section (A/D conversion section) 25, a bus 26, an SDRAM 27, an AF processing section 28, an AE processing section 29, a posture detecting section 30, a combination processing section 31, an image processing section 32, a JPEG processing section 36, a monitor driver 37, a monitor 38, a Hall element 39, a memory interface (memory I/F) 41, a recording medium 42, an operation section 43, a flash memory 44, and a microcomputer 45.

The mechanical shutter 21 controls a time period in which a light beam from the lens 11 reaches the image sensor 22. The mechanical shutter 21 is, for example, a mechanical shutter having a configuration for causing a shutter curtain to travel. The mechanical shutter 21 is driven by a command of the microcomputer 45 and controls the reaching time of the light beam to the image sensor 22. When an exposure start and an exposure end are specified by only the mechanical shutter 21, the reaching time of the light beam is an exposure time of the object by the image sensor 22. Note that, when a plurality of image data are acquired while performing the pixel shift in the pixel shift super resolution photographing mode explained below, the mechanical shutter 21 is maintained in an open state from the point in time before the first image is acquired until the point in time after the last image is acquired.

Figure 13:
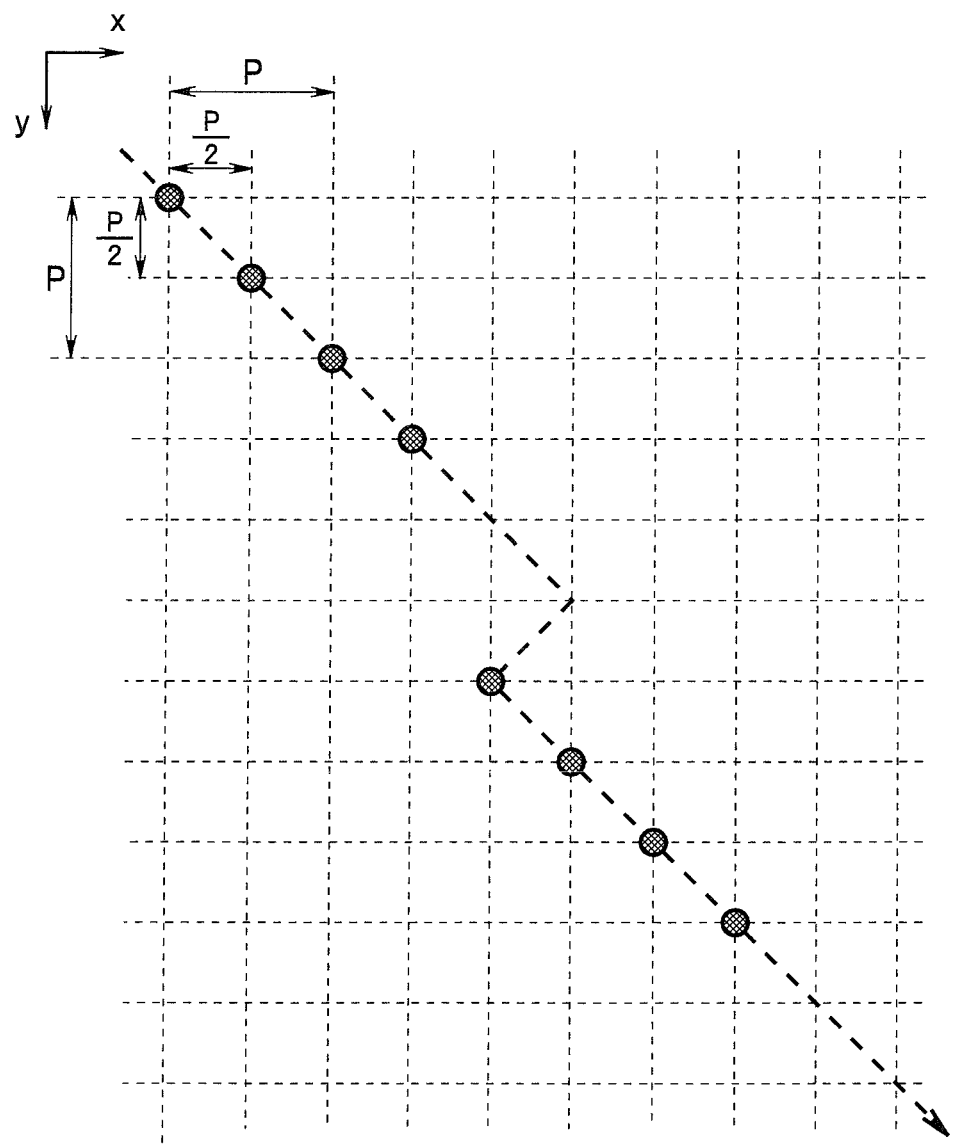
FIG. 13 is a diagram showing pixel exposure positions in respective frames of a line read out first in an image when the exposure time is shorter than the image capturing time in the first embodiment.

The image sensor 22 includes a plurality of pixels two-dimensionally arrayed at a predetermined pixel pitch (see a pixel pitch P shown in FIG. 13 and the like). The image sensor 22 photoelectrically converts an optical image of the object formed via the lens 11 and the aperture 12 to generate an analog image signal on the basis of control by the microcomputer 45, which is an image-pickup control section. The image sensor 22 reads out photographed image data in predetermined readout order (e.g., order of rolling readout (or raster scan)).

The image sensor 22 of the present embodiment is configured as, for example, a single plate-type image sensor in which color filters of a primary color Bayer array are disposed on front surfaces of a plurality of pixels arrayed in a vertical direction and a horizontal direction. Note that, naturally, the image sensor 22 is not limited to the single plate-type image sensor and may be, for example, a stacked-type image sensor that separates color components in a plate thickness direction.

The voice coil motor (VCM) 23 is a displacing section configured to displace relative positions of the image sensor 22 and a light beam, which is received by the image sensor 22, in a two-dimensional pixel array direction and is a pixel shifting section configured to move the relative positions to set a movement amount of a frame period to a non-integer multiple of a pixel pitch (e.g., in units of a half pixel pitch). In this case, the voice coil motor (VCM) 23 sets the movement of the relative positions during the exposures in the same moving direction and the same movement amount (therefore, the same average moving speed) in each of exposures performed a plurality of times in order to acquire image data of a plurality of frames in the pixel shift super resolution photographing mode. A specific configuration of the voice coil motor (VCM) 23 is to, for example, float the image sensor 22 in the air with a magnetic force and control the magnetic force to thereby move a position of the image sensor 22 in a plane perpendicular to an optical axis of the lens 11.

Note that the voice coil motor (VCM) 23 is explained as an example of the pixel shifting section. However, the pixel shifting section is not limited to this. Other appropriate mechanism that can perform the pixel shift can be used.

After reducing reset noise and the like, the analog processing section 24 performs waveform shaping on the analog image signal read out from the image sensor 22 and further performs gain-up to obtain target brightness.

The A/D conversion section 25 converts the analog image signal outputted from the analog processing section 24 into a digital image signal (hereinafter referred to as image data).

The bus 26 is a transfer path for transferring various data and control signals generated in a certain place in the digital camera to another place in the digital camera. The bus 26 in the present embodiment is connected to the voice coil motor (VCM) 23, the A/D conversion section 25, the SDRAM 27, the AF processing section 28, the AE processing section 29, the posture detecting section 30, the combination processing section 31, the image processing section 32, the JPEG processing section 36, the monitor driver 37, the Hall element 39, the memory I/F 41, and the microcomputer 45.

The image data outputted from the A/D conversion section 25 (in the following explanation, referred to as RAW image data as appropriate) is transferred via the bus 26 and once stored in the SDRAM 27.

The SDRAM 27 is a storing section configured to temporarily store the RAW image data explained above or various data such as image data processed in the combination processing section 31, the image processing section 32, the JPEG processing section 36, and the like.

The AF processing section 28 extracts a signal of a high-frequency component from the RAW image data and acquires a focus evaluation value through AF (autofocus) integration processing. The acquired focus evaluation value is used for AF driving of the lens 11. Note that, naturally, AF is not limited to such contrast AF. For example, phase difference AF may be performed using an exclusive AF sensor (or a pixel for AF on the image sensor 22).

The AE processing section 29 calculates object luminance on the basis of the RAW image data. The calculated object luminance is used for automatic exposure (AE) control, that is, control of the aperture 12 and control of the mechanical shutter 21, exposure timing control of the image sensor 22 (or control of a so-called element shutter), and the like. Note that the RAW image data is used as data for calculating the object luminance. However, instead of the RAW image data, data obtained by providing an exclusive photometric sensor in the digital camera may be used.

The posture detecting section 30 includes a gravity sensor or the like and detects a gravity direction with respect to the image pickup apparatus. A result of the detection is used for, for example, determination of a posture of the digital camera during photographing (e.g., a standard position where a screen is laterally long with respect to the gravity direction or a longitudinal position where the screen is longitudinally long).

The combination processing section 31 is an image combining section configured to, according to control by the microcomputer 45, which is the image-pickup control section, drive the voice coil motor (VCM) 23 to move the image sensor 22, perform photographing, combine acquired image data of a plurality of frames, and generate combined image data having higher resolution (referred to as super resolution image as appropriate) than the image data obtained from the image sensor 22.

The image processing section 32 performs various kinds of image processing on the RAW image data or the combined image data generated by the combination processing section 31 and includes a synchronization processing section 33, an edge-enhancement processing section 34, and a noise-reduction processing section 35.

The synchronization processing section 33 performs synchronization processing for converting image data of a Bayer array, in which only one color component among RGB components is present for one pixel, into image data, in which all pixels include all of three color components of RGB, by interpolating and calculating color components absent in a pixel of attention from peripheral pixels.

The edge-enhancement processing section 34 performs edge enhancement processing on the image data.

The noise-reduction processing section 35 performs noise reduction processing by performing, for example, coring processing corresponding to a space frequency on the image data.

The image data after the various kinds of processing are performed by the image processing section 32 in this way is stored in the SDRAM 27 again.

When recording the image data, the JPEG processing section 36 reads out the image data from the SDRAM 27, compresses the read-out image data according to a JPEG compression scheme, and causes the SDRAM 27 to once store the compressed image data. The compressed image data stored in the SDRAM 27 in this way is added with a header necessary for configuring a file and arranged as data for recording by the microcomputer 45. The arranged data for recording is recorded in the recording medium 42 via the memory I/F 41 on the basis of the control by the microcomputer 45.

The JPEG processing section 36 also performs expansion of the read-out image data. That is, when reproduction of a recorded image is performed, for example, a JPEG file is read out from the recording medium 42 via the memory I/F 41 and once stored in the SDRAM 27 on the basis of the control by the microcomputer 45. The JPEG processing section 36 reads out the JPEG image data stored in the SDRAM 27, expands the read-out JPEG image data according to a JPEG expansion scheme, and causes the SDRAM 27 to store the expanded image data.

The monitor driver 37 reads out the image data stored in the SDRAM 27, converts the read-out image data into a video signal, performs driving control of the monitor 38, and causes the monitor 38 to display an image based on the video signal. The image display performed by the monitor driver 37 includes rec view display for displaying image data immediately after photographing for a short time, reproduction display of a JPEG file recorded in the recording medium 42, live view display, and the like.

The monitor 38 displays an image and displays various kinds of information related to the digital camera according to the driving control of the monitor driver 37 explained above.

The Hall element 39 is a position detecting section configured to detect, in time series, the relative position explained above during the photographing operation of the image sensor 22 moved by the voice coil motor (VCM) 23. The Hall element 39 is used as the position detecting section. However, naturally, the position detecting section is not limited to the Hall element 39.

As explained above, the memory I/F 41 performs the writing of the image data in the recording medium 42 and the readout of the image data from the recording medium 42.

The recording medium 42 stores the image data in a nonvolatile manner. The recording medium 42 is configured by a memory card or the like detachably attachable to the camera main body 2. However, the recording medium 42 is not limited to the memory card and may be a disk-like recording medium or may be any other recording media. Therefore, the recording medium 42 does not need to be a component peculiar to the digital camera.

The operation section 43 is a section for a photographer to perform various operation inputs to the digital camera. The operation section 43 includes operation buttons and the like such as a power button for turning on/off a power supply of the digital camera, a release button having two-stage operation buttons including, for example, a 1st (first) release switch and a 2nd (second) release switch for instructing a start of photographing of an image, a reproduction button for performing reproduction of a recorded image, a menu button for performing setting and the like of the digital camera, a cross key used for selection operation for items, and an OK button used for decision operation for selected items.

Items that the photographer can set using the menu button, the cross key, the OK button, and the like include photographing modes (a normal photographing mode, a pixel shift super resolution photographing mode, etc.), recording modes (a JPEG recording mode, a RAW+JPEG recording mode, etc.), and the like. When operation is performed on the operation section 43, a signal corresponding to operation content is outputted to the microcomputer 45.

The flash memory 44 is a storage medium configured to store, in a nonvolatile manner, processing programs executed by the microcomputer 45 and various kinds of information related to the digital camera. Several examples of the information stored by the flash memory 44 include parameters used for the edge enhancement processing and parameters used for the noise reduction processing, various parameters necessary for operation of the digital camera such as a band extraction filter fb and a band enhancement parameter α used for band enhancement processing of a band enhancing section 54 explained below, information such as magnitude, a direction, and order of the pixel shift in the pixel shift super resolution photographing mode, and a manufacture number for specifying the digital camera. The information stored by the flash memory 44 is read by the microcomputer 45.

The microcomputer 45 controls the respective sections in the camera main body 2 and transmits a command to the microcomputer 15 via the interface 3 to control the interchangeable lens 1. The microcomputer 45 is a control section that collectively controls the digital camera. When an operation input is performed from the operation section 43 by the user, the microcomputer 45 reads parameters necessary for processing from the flash memory 44 and executes various sequences corresponding to operation content according to the processing program stored in the flash memory 44.

The microcomputer 45 also functions as an image-pickup control section configured to control the image sensor 22 to perform, while controlling the voice coil motor (VCM) 23 to perform the pixel shift for moving the relative positions, exposures a plurality of times during the movement of the relative positions and acquire image data of a plurality of frames.

Further, the microcomputer 45 also functions as a pixel-shift-movement setting section configured to set a moving method for the relative positions of the light beam and the image sensor 22 by the voice coil motor (VCM) 23, which is the pixel shifting section.

Figure 2:
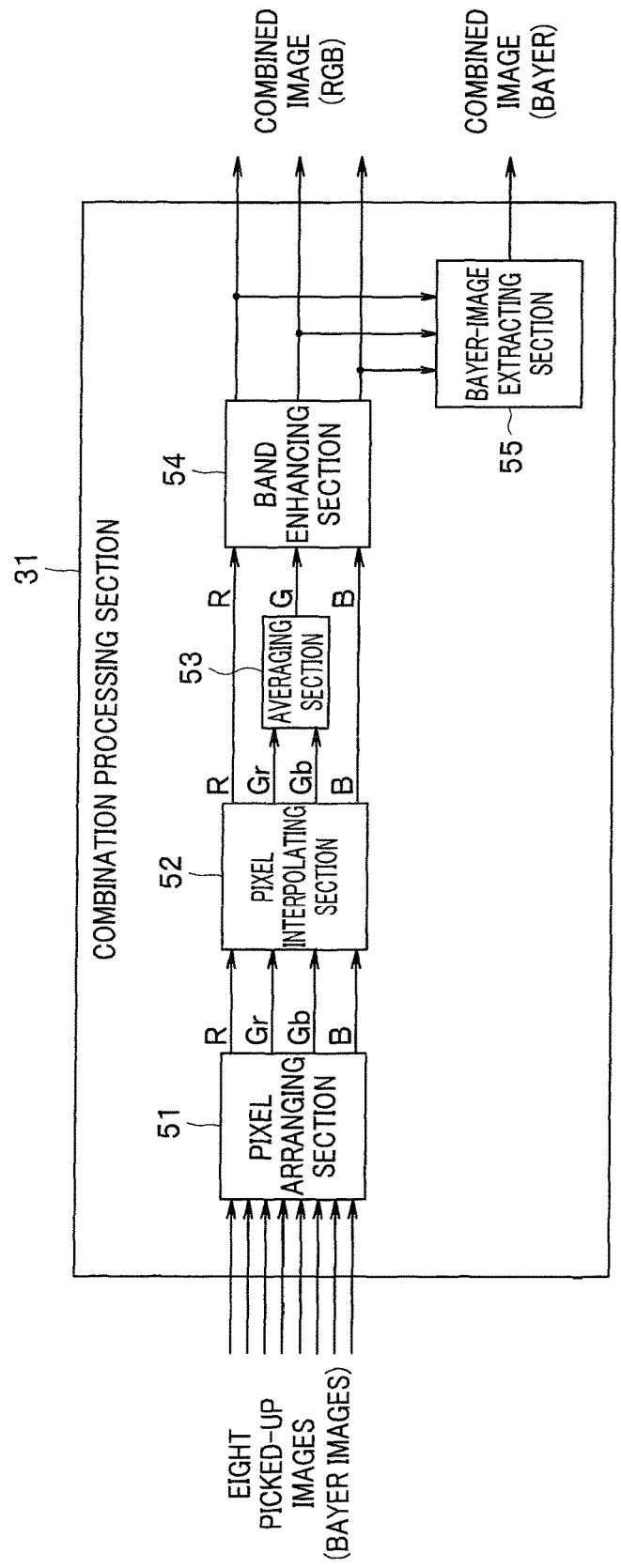
FIG. 2 is a block diagram showing a configuration of a combination processing section of the first embodiment.

FIG. 2 is a block diagram showing a configuration of the combination processing section 31.

The combination processing section 31 includes a pixel arranging section 51, a pixel interpolating section 52, an averaging section 53, a band enhancing section 54, and a Bayer-image extracting section 55.

The pixel arranging section 51 separates eight Bayer images acquired in the pixel shift super resolution photographing mode respectively into R components, Gr components (G components present on a line on which the R components are present), Gb components (G components present on a line on which B components are present), and B components and arranges the components according to pixel shift positions.

Figures 3, 4:
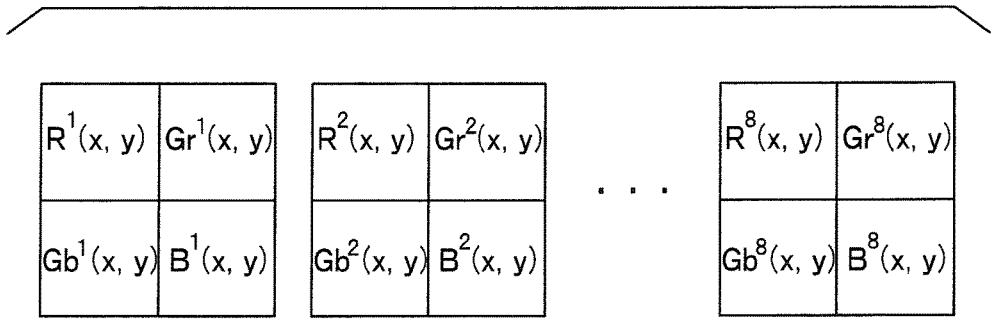
FIG. 3 is a diagram showing basic pixel arrangement of R, Gr, Gb, and B in eight Bayer images obtained by photographing in the first embodiment.
FIG. 4 is a diagram showing R pixel arrangement obtained by a pixel arranging section from the eight Bayer images of the pixel arrangement shown in FIG. 3 in the first embodiment.

FIG. 3 is a diagram showing a basic pixel arrangement of R, Gr, Gb, and B in the eight Bayer images obtained by photographing. FIG. 4 is a diagram showing an R pixel arrangement obtained by the pixel arranging section 51 from the eight Bayer images of the pixel arrangement shown in FIG. 3. FIG. 5 is a diagram showing a Gr pixel arrangement obtained by the pixel arranging section 51 from the eight Bayer images of the pixel arrangement shown in FIG. 3. FIG. 6 is a diagram showing a Gb pixel arrangement obtained by the pixel arranging section 51 from the eight Bayer images of the pixel arrangement shown in FIG. 3. FIG. 7 is a diagram showing a B pixel arrangement obtained by the pixel arranging section 51 from the eight Bayer images of the pixel arrangement shown in FIG. 3.

In the respective color components R, Gr, Gb, and B shown in FIG. 3 to FIG. 7, (x, y) indicates a pixel position in the horizontal direction (an x direction) and the vertical direction (a y direction) in the image sensor 22. A number of any one of 1 to 8 attached to an upper right corner indicates which one of the eight Bayer images.

The pixel arranging section 51 extracts the R components from the eight Bayer images configured by repeating the basic pixel arrangement shown in FIG. 3, rearranges the R components according to a pixel shift route of the image sensor 22 explained below with reference to FIG. 12 to FIG. 20, and generates an R combined image of a pixel arrangement in which eight R components are arrayed in a 4×4 pixel array shown in FIG. 4. Similarly, the pixel arranging section 51 respectively extracts the Gr, Gb, and B components from the eight Bayer images, rearranges the Gr, Gb, and B components according to pixel shift routes, and respectively generates a Gr combined image, a Gb combined image, and a B combined image of the pixel arrangements respectively shown in FIG. 5, FIG. 6, and FIG. 7.

The pixel interpolating section 52 interpolates R components missing in FIG. 4 on the basis of the R components around the R components, interpolates Gr components missing in FIG. 5 on the basis of the Gr components around the Gr components, interpolates Gb components missing in FIG. 6 on the basis of the Gb components around the Gb components, and interpolates B components missing in FIG. 7 on the basis of the B components around the B components.

The averaging section 53 averages the Gr combined image and the Gb combined image, which are interpolated by the pixel interpolating section 52, by, for example, adding up the Gr combined image and the Gb combined image in pixel positions corresponding to each other and dividing an added-up value by two. It is possible to reduce noise and achieve improvement of image quality through the averaging.

The band enhancing section 54 enhances, with respect to the combined image data, frequency components in a direction same as the moving direction of the relative positions explained above during the exposures (the moving direction is the same in the respective eight times of exposure as explained below in detail). That is, as explained below with reference to FIG. 8, the band enhancing section 54 band-enhances frequency components in a direction same as a pixel shift direction in the R combined image and the B combined image interpolated by the pixel interpolating section 52 and an averaged GrGb combined image (a G combined image) outputted from the averaging section 53. An image band-enhanced by the band enhancing section 54 is at least outputted as an RGB combined image or processed by the Bayer-image extracting section 55 and outputted as a Bayer combined image. When the RGB combined image is outputted, the processing of the synchronization processing section 33 can be omitted.

The Bayer-image extracting section 55 extracts a Bayer array super resolution image of a single plate from the R combined image, the B combined image, and the GrGb combined image of three plates band-enhanced by the band enhancing section 54 and outputs the Bayer array super resolution image as a Bayer combined image.

According to such combination processing, in the pixel shift super resolution photographing mode, a super resolution image having double resolution in the horizontal direction and having double resolution in the vertical direction is obtained.

Figure 8:
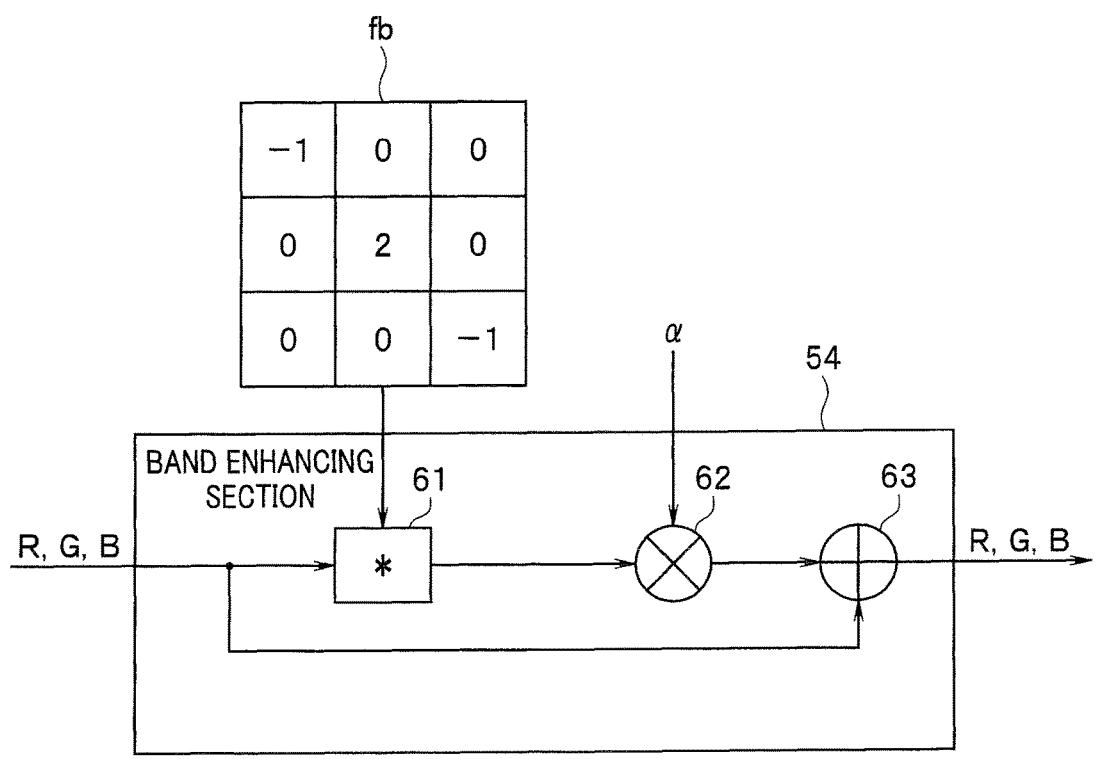
FIG. 8 is a block diagram showing a configuration of a band enhancing section in the first embodiment.

FIG. 8 is a block diagram showing a configuration of the band enhancing section 54.

In a configuration example shown in FIG. 8, the band enhancing section 54 includes a filter operation section 61, a multiplication section 62, and an addition section 63.

The filter operation section 61 extracts, with respect to the R combined image and the B combined image inputted from the pixel interpolating section 52 and the GrGb combined image after the averaging inputted from the averaging section 53, for example, a pixel block of 3×3 pixels centering on a pixel position of attention, causes the band extraction filter fb having, for example, a matrix of three rows and three columns shown in FIG. 8 to act on the extracted 3×3 pixels, and extracts band components in a specific direction of the pixel position of attention.

The band extraction filter fb shown in FIG. 8 is an example of a filter that extracts band components in an oblique direction from upper left to lower right. The band components extracted by causing the band extraction filter fb to act are frequency components in the direction same as the pixel shift direction. Therefore, as the band extraction filter fb, different filters are used according to pixel shift directions at the time when the eight Bayer images are photographed. For example, when the pixel shift direction is a direction from upper right to lower left, by using a filter that extracts band components in an oblique direction from the upper right to the lower left, such a filter has a matrix of three rows and three columns in which an upper right component is −1, a center component is 2, a lower left component is −1, and the other components are 0.

The multiplication section 62 multiplies the frequency components of the pixel position of attention extracted by the filter operation section 61 with the band enhancement parameter $\alpha$ to thereby adjust a band enhancement degree.

The addition section 63 adds the frequency components of the pixel position of attention after the adjustment outputted from the multiplication section 62 to pixel data of an original pixel of attention to perform band enhancement and outputs a band enhancement result.

The band enhancement processing is completed by performing such processing on all pixel positions while moving the pixel position of attention, for example, in order of raster scan.

Figure 9:
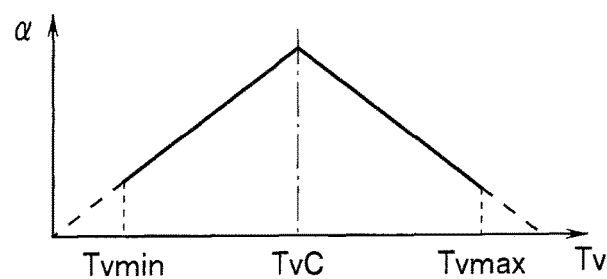
FIG. 9 is a graph showing an example of a change of a band enhancement parameter α corresponding to a Tv value in the first embodiment.

FIG. 9 is a graph showing an example of a change in the band enhancement parameter $\alpha$ corresponding to the Tv value.

In the present embodiment, the pixel shift and the exposure are performed simultaneously (i.e., in parallel). An image blur that occurs at this point changes according to an exposure time Texp as explained below with reference to FIG. 12 to FIG. 20. More specifically, the image blur is the largest when the exposure time Texp of one frame is equal to an image capturing time Tc from the image sensor 22. The image blur decreases when the exposure time Texp is shorter than the image capturing time Tc. The image blur also decreases when the exposure time Texp is longer than the image capturing time Tc to the contrary. Therefore, the band enhancement parameter α is set to a large value when the image blur is large and set to a small value when the image blur is small.

That is, when a TV value of an APEX system corresponding to the image capturing time Tc is represented as TvC, as shown in FIG. 9, the band enhancement parameter α is set to monotonously increase according to an increase in the Tv value (the Tv value corresponding to the exposure time Texp) when Tv<TvC, take a maximum value when Tv=TvC, and monotonously decrease according to an increase in the Tv value when TvC<Tv. Note that Tvmin in FIG. 9 corresponds to a longest second at shutter speed and Tvmax corresponds to a shortest second at the shutter speed.

In this way, the band enhancing section 54 changes an enhancement degree of the band enhancement according to the exposure time Texp to maximize the enhancement degree when the exposure time Texp of one frame is equal to the image capturing time Tc from the image sensor 22.

Figure 10:
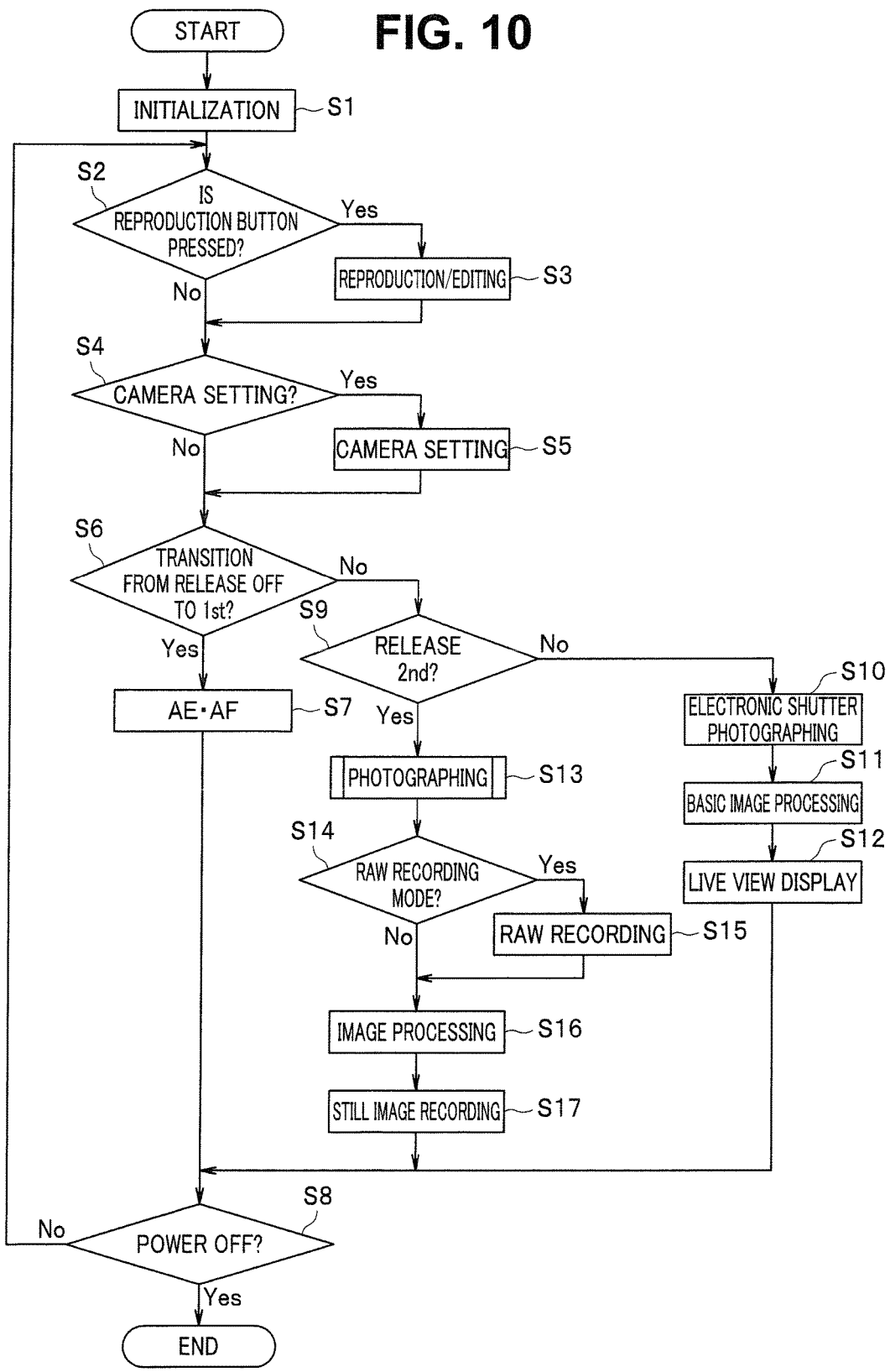
FIG. 10 is a flowchart showing a flow of main processing in the digital camera of the first embodiment.

FIG. 10 is a flowchart showing a flow of main processing in the digital camera. Processing shown in FIG. 10 is performed on the basis of the control by the microcomputer 45.

When the power button of the operation section 43 is ON-operated and the power supply of the digital camera is turned on, the main processing is started. First, the microcomputer 45 performs initialization of the digital camera (step S1).

Subsequently, the microcomputer 45 determines whether the reproduction button of the operation section 43 is operated (step S2).

When the reproduction button is operated, the microcomputer 45 performs reproduction/editing processing (step S3). The reproduction/editing processing is processing for displaying a list of files recorded in the recording medium 42 and, waiting for selection operation from the user, reproducing a selected and determined file or editing a selected image.

When the reproduction button is not operated in step S2 or the processing in step S3 is performed, the microcomputer 45 determines whether the menu button of the operation section 43 is operated and camera setting concerning the digital camera is selected (step S4).

When the camera setting is selected, the microcomputer 45 displays a menu for changing the camera setting on the monitor 38 and stands by for user operation for changing the camera setting to be performed from the operation section 43. Several examples of the camera setting include:

a photographing mode: the normal photographing mode and the pixel shift super resolution photographing mode, and a recording mode: the JPEG recording mode and the RAW+JPEG recording mode, explained above. However, the camera setting is not limited to these modes.

When the user operation is performed, the microcomputer 45 performs the camera setting according to operation content (step S5).

When the camera setting is not selected in step S4 or the processing in step S5 is performed, the microcomputer 45 determines whether the release button transitions from OFF to a state of 1st release ON, which is a pressed state of a first stage (a so-called half-pressed state) (step S6).

When the release button transitions to the state of the 1st release ON, at timing of the transition, the microcomputer 45 performs, with the AE processing section 29, automatic exposure (AE) control for photographing an image and performs automatic focus control (AF) with the AF processing section 28 (step S7). Consequently, after the 1st release button is pressed, so-called AE lock and AF lock are performed.

The microcomputer 45 determines whether the power button is OFF-operated (step S8). When the power button is not OFF-operated, the microcomputer 45 returns to step S2 and repeatedly performs the processing explained above.

When the release button does not transition to the state of the 1st release ON in step S6, the microcomputer 45 determines whether the release button is in a state of 2nd release ON (a so-called full-pressed state), which is a pressed state of a second stage (step S9).

When the release button is not in the state of the 2nd release ON, the microcomputer 45 changes the mechanical shutter 21 to an open state, performs automatic exposure (AE) control for live view with the AE processing section 29, and performs image photographing for one frame (or one field, etc.) by an electronic shutter (step S10).

The microcomputer 45 performs, on an image photographed in this way, basic image processing in which several kinds of image processing performed on a recorded image are, for example, omitted (step S11) and displays a frame image subjected to the basic image processing on the monitor 38 as one frame of live view (step S12).

Thereafter, the microcomputer 45 shifts to the processing in step S8 and determines whether the power button is OFF-operated. When the power button is not OFF-operated, the microcomputer 45 returns to step S2 and repeatedly performs the processing explained above.

On the other hand, when the release button is in the state of the 2nd release ON in step S9, the microcomputer 45 executes photographing processing explained below with reference to FIG. 11 (step S13).

Subsequently, the microcomputer 45 determines whether a RAW recording mode is set (step S14). When the RAW recording mode is set, the microcomputer 45 records a RAW image in the recording medium 42 as a file (step S15).

When the RAW recording mode is not set in step S14 or the processing in step S15 is performed, the microcomputer 45 performs, with the image processing section 32, image processing on the image obtained by the photographing (step S16).

Thereafter, the microcomputer 45 JPEG-compresses the image subjected to the image processing, adds a header to the image, and records the image in the recording medium 42 as a JPEG file (step S17).

When the processing in step S17 is performed, the microcomputer 45 shifts to the processing in step S8 and determines whether the power button is OFF-operated.

In this way, when the power button is OFF-operated in step S8, the microcomputer 45 ends the main processing.

Figure 11:
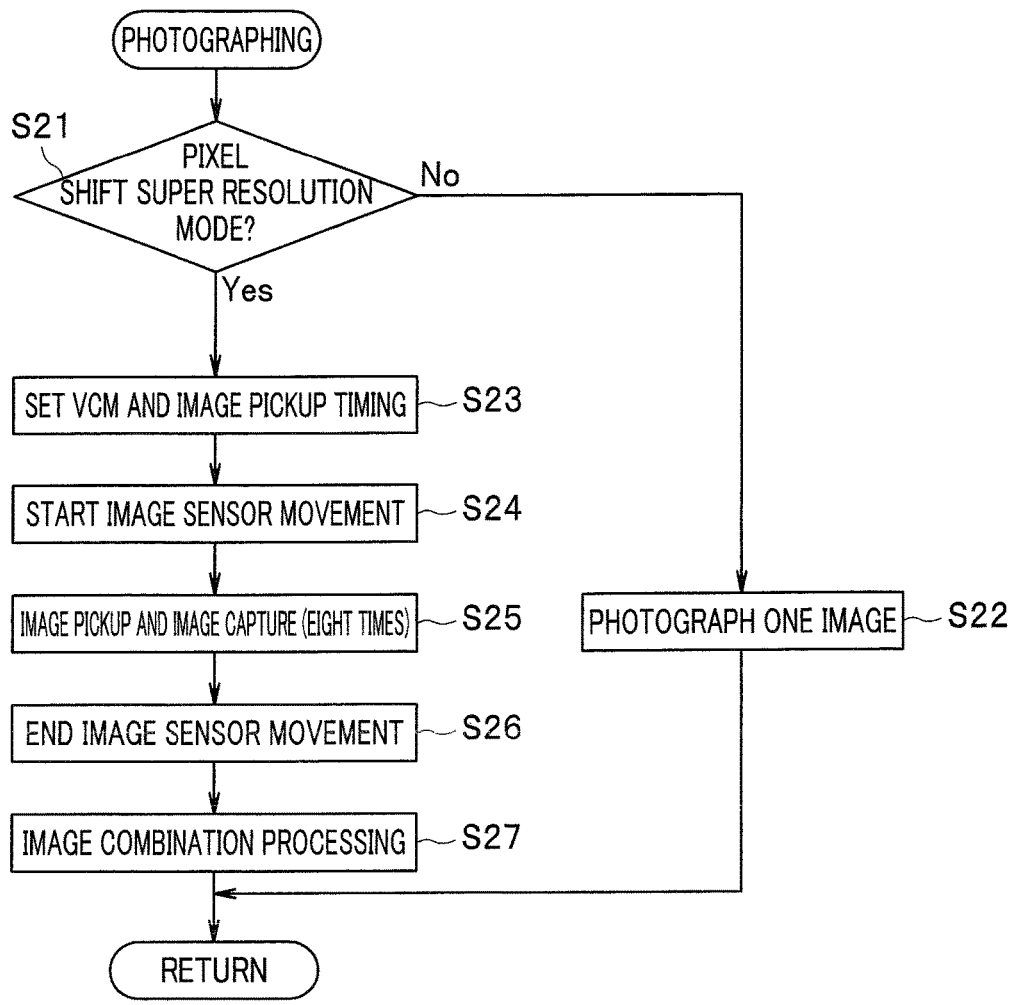
FIG. 11 is a flowchart showing a flow of photographing processing in the digital camera of the first embodiment.

FIG. 11 is a flowchart showing a flow of photographing processing in the digital camera.

When starting the processing, the microcomputer 45 determines whether the photographing mode is set in the pixel shift super resolution photographing mode (step S21).

When the photographing mode is not set in the pixel shift super resolution photographing mode, the microcomputer 45 drives the aperture 12 to open the mechanical shutter 21, performs exposure with the image sensor 22, and performs normal photographing processing for photographing one image (step S22).

When the photographing mode is set in the pixel shift super resolution photographing mode, the microcomputer 45 sets a moving direction and moving speed of the image sensor 22 by the voice coil motor (VCM) 23, image pickup timing of respective images by the image sensor 22, and the like (step S23).

Further, as explained above, the microcomputer 45 maintains the mechanical shutter 21 in an open state, maintains an opening diameter of the aperture 12 constant, and starts movement of the image sensor 22 with the voice coil motor (VCM) 23 (step S24).

At the set image pickup timing, the microcomputer 45 performs exposures with the image sensor 22 and captures an exposed image, a predetermined number of times, in the present embodiment, for example, eight times (step S25).

When photographing of the predetermined number of times ends, the microcomputer 45 stops the voice coil motor (VCM) 23 to thereby end the movement of the image sensor 22 (step S26).

The microcomputer 45 performs, with the combination processing section 31, combination processing of eight images obtained by the photographing and generates one super resolution image (step S27).

When the processing in step S27 or step S22 ends, the microcomputer 45 returns from the processing to the processing shown in FIG. 2.

Figure 12:
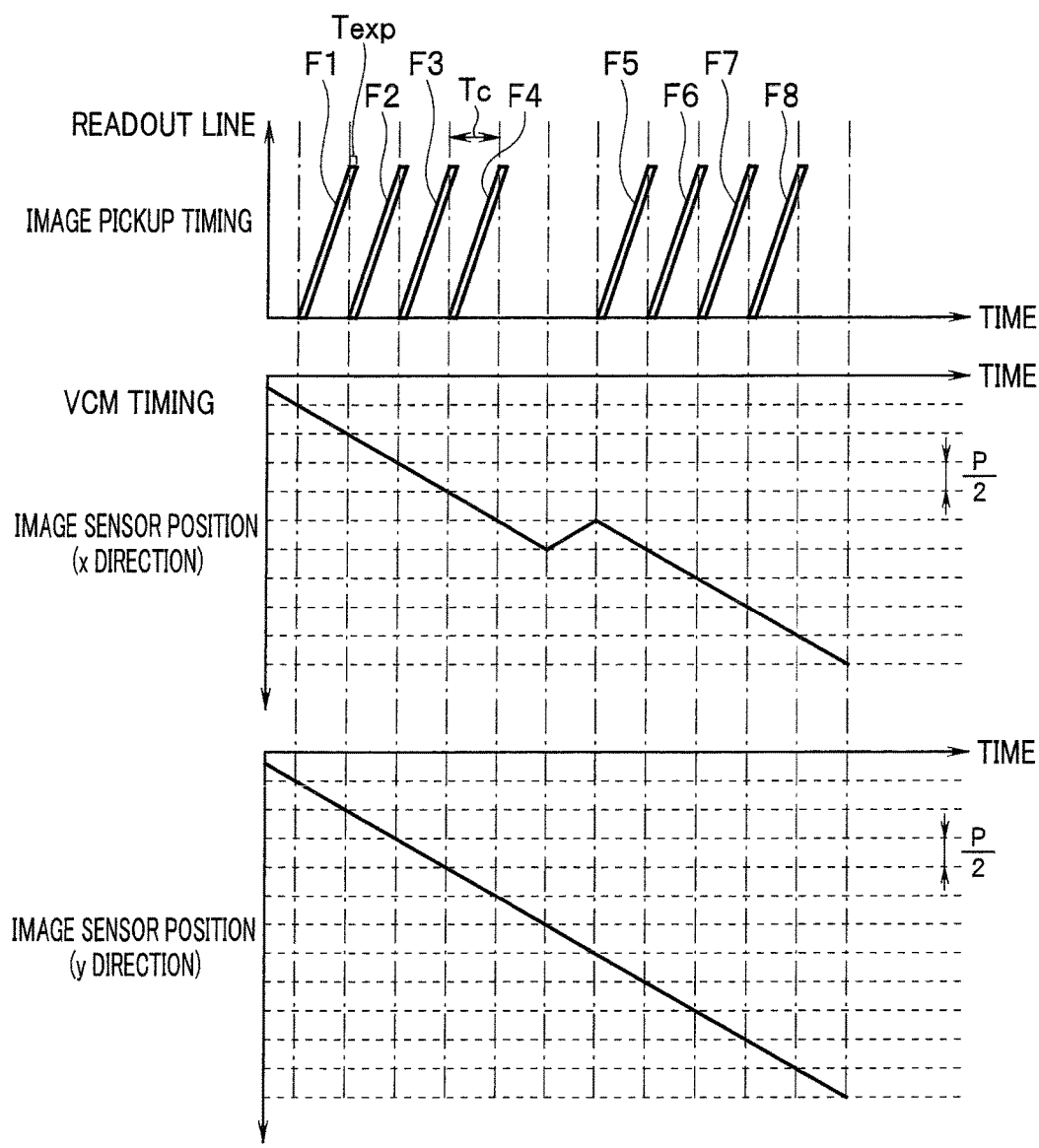
FIG. 12 is a graph showing image pickup timing of an image sensor and driving timings in an x direction and a y direction of the image sensor by a voice coil motor (VCM) at the time when an exposure time is shorter than an image capturing time in the first embodiment.
Figure 14:
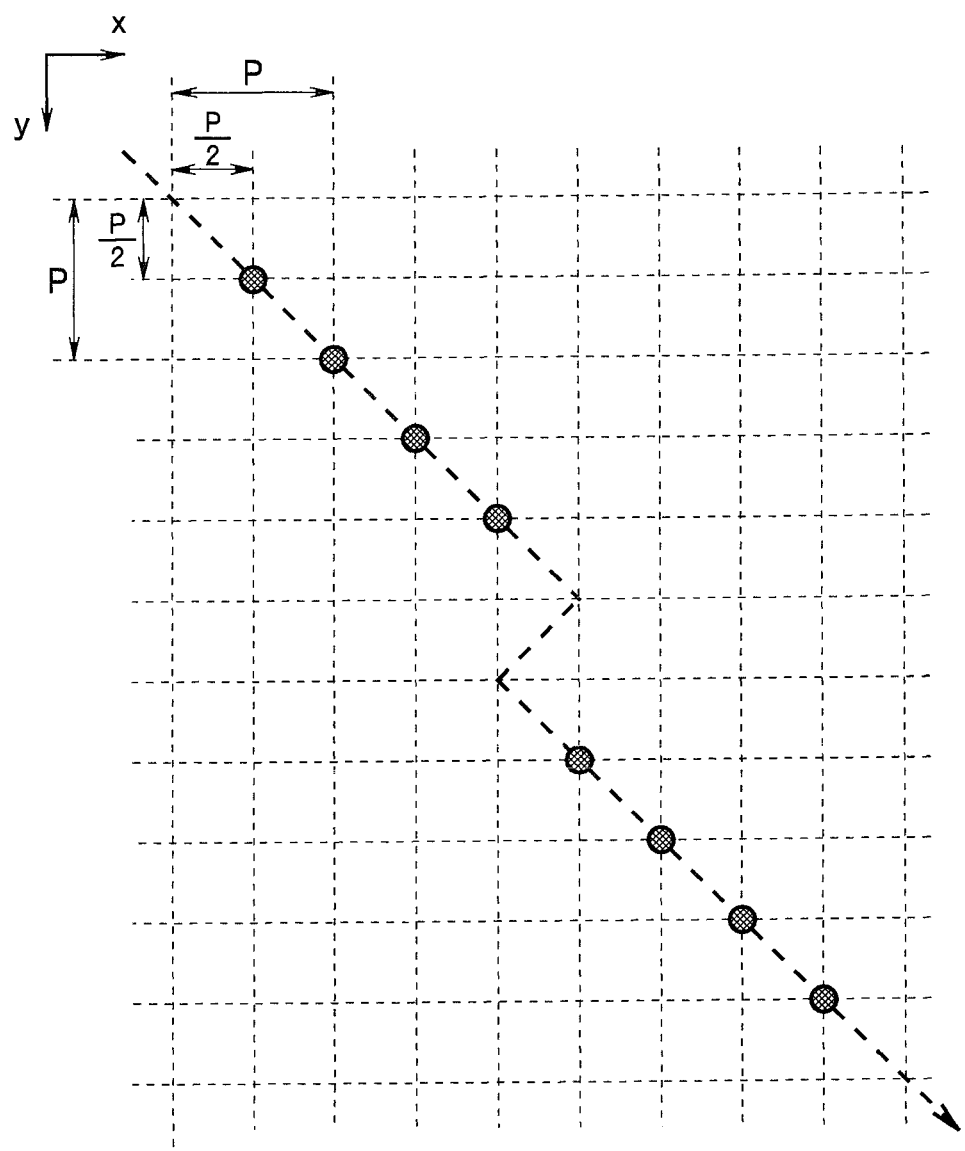
FIG. 14 is a diagram showing pixel exposure positions in respective frames of a line read out last in an image when the exposure time is shorter than the image capturing time in the first embodiment.

Exposure on pixels at the time when the exposure time Texp is shorter than the image capturing time Tc is explained with reference to FIG. 12 to FIG. 14. FIG. 12 is a graph showing image pickup timing of the image sensor 22 and driving timings in the x direction and the y direction of the image sensor 22 by the voice coil motor (VCM) 23 at the time when the exposure time Texp is shorter than the image capturing time Tc. FIG. 13 is a diagram showing pixel exposure positions in respective frames of a line read out first in an image when the exposure time Texp is shorter than the image capturing time Tc. FIG. 14 is a diagram showing pixel exposure positions in respective frames of a line read out last in an image when the exposure time Texp is shorter than the image capturing time Tc.

In the present embodiment, the image sensor 22 performs the electronic rolling shutter photographing as explained above. An exposure start is sequentially performed by shifting timing for each of lines. Readout of pixels for which the exposure time Texp elapses is also sequentially performed by shifting timing for each of the lines. A time period from exposure start time of a first line to exposure start time of a last line is the image capturing time Tc. Further, exposure of a first line of a next frame is started immediately after exposure of the last line is started. Therefore, the image capturing time Tc is also a frame period. In FIG. 12 to FIG. 14, as explained above, an example is shown in which Texp<Tc.

By repeatedly performing such photographing eight times, respective images of a first frame F1 to an eighth frame F8 are sequentially acquired.

At this point, in the present embodiment, the voice coil motor (VCM) 23 is continuously operated to perform the pixel shift. Therefore, in the present embodiment, the pixel shift and the exposure are simultaneously performed. The pixel shift and the image capturing are also simultaneously performed.

However, when the pixel shift is performed simultaneously with the exposure, an image blurs. Therefore, in the present embodiment, the pixel shift simultaneously performed with the exposure is limited to only specific one direction to prevent a blur from occurring in directions other than the direction. Further, frequency components in a direction same as a direction of the pixel shift in an image are band-enhanced by the band enhancing section 54 as explained above to reduce a blur of the image.

In a group of pixels arrayed in the horizontal direction (e.g., the x direction shown in FIG. 13) and the vertical direction (e.g., the y direction shown in FIG. 13 (note that, in FIG. 12 to FIG. 20, the downward direction is set as a positive direction of a y axis)) on the image sensor 22, the direction of the pixel shift simultaneously performed with the exposure is as explained below. That is, the pixel shift direction (in the present embodiment, the moving direction of the image sensor 22) is any one of an oblique 45° direction [a (1, 1) direction] from upper left to lower right, an oblique 45° direction [a (−1, 1) direction] from upper right to lower left, an oblique 45° direction [a (−1, −1) direction] from the lower right to the upper left, and an oblique 45° direction [a (1, −1) direction] from the lower left to the upper right. Note that the pixel shift direction is oblique 45° because a square pixel is assumed. However, for example, in the case of a rectangular pixel, the pixel shift direction is directions of diagonal lines.

Speed of the pixel shift only has to be set such that a movement amount in the x and y respective directions only has to be a half P/2 of a pixel pitch P per image capturing time Tc. The speed of the pixel shift is obtained by multiplying the pixel shift direction vectors (1, 1), (−1, 1), (−1, −1), and (1, −1) with P/(2Tc). Therefore, magnitude (quickness) of the speed of the pixel shift is P/(√2×Tc). Consequently, when the pixel shift direction is, for example, (1, 1), in the second frame F2, the pixel exposure position is moved by (P/2, P/2) with respect to the first frame F1.

In order to obtain a mosaic-like pixel array after combination shown in FIG. 4 to FIG. 7, the pixel shift direction has to be shifted by magnitude P/√2 in a direction orthogonal to the pixel shift direction. Therefore, in the present embodiment, the first frame F1 to the eighth frame F8 are divided into a first group including the first frame F1 to the fourth frame F4 and a second group including the fifth frame F5 to the eight frame F8. The pixel shift direction is shifted by the magnitude P/√2 in the direction orthogonal to the pixel shift direction between the first group and the second group. Since the shift in the direction orthogonal to the pixel shift direction only has to be performed once, the method has an advantage that it is possible to set a total photographing time from the first frame F1 to the eighth frame F8 shortest.

More specifically, when pixel shift direction shown in FIG. 12 to FIG. 14 is (1, 1), a position of the image sensor 22 is shifted by (−P/2, P/2) in the (−1, 1) direction in the image capturing time Tc immediately before an exposure start of the fifth frame F5. Thereafter, image pickup of the respective frames of the second group is performed while performing the pixel shift in the (1, 1) direction again from an exposure start point in time of the fifth frame F5.

When such a pixel shift is performed, the image sensor 22 moves in a direction of a dotted line in FIG. 13 and FIG. 14.

In the case shown in FIG. 12 to FIG. 14, since the exposure time Texp is shorter than the image capturing time Tc, the pixel exposure positions in the respective frames are clearly separated and can be represented as, for example, dot-like black circles shown in FIG. 13 and FIG. 14.

First, the pixel exposure position in the first frame F1 is, for example, a position of a black circuit shown in upper left in FIG. 13 and FIG. 14. According to shifting from the second frame F2 to the fourth frame F4 in order, the pixel exposure position moves to the lower right by (P/2, P/2) at a time. Thereafter, the pixel exposure position shifts by (−P/2, P/2) before the shift to the fifth frame. In the fifth frame F5 to the eighth frame F8, the exposure position moves to the lower right by (P/2, P/2) at a time again.

At this point, as indicated by the image pickup timing in FIG. 12, whereas a lower end of a readout line is exposed first in the frame period, an upper end of the readout line is exposed last in the frame period. Therefore, the pixel exposure positions are different by (P/2, P/2). Therefore, even if a moving route of the image sensor 22 indicated by a dotted line arrow in FIG. 13 and a moving route of the image sensor 22 indicated by a dotted line arrow in FIG. 14 are the same, the pixel exposure positions on the moving routes are different by (P/2, P/2) along the direction of the dotted line arrow at the lower end of the readout line shown in FIG. 13 and the upper end of the readout line shown in FIG. 14.

However, a relative relation of the exposure positions among the frames in any pixels is the same. That is, in the second to fourth and sixth to eighth frames F2 to F4 and F6 to F8, the pixel exposure positions are respectively moved by (P/2, P/2) with respect to the first to third and fifth to seventh frames F1 to F3 and F5 to F7 and, in the fifth frame F5, the pixel exposure position is moved by (P/2, 3P/2) with respect to the fourth frame F4. This holds in any pixels (i.e., irrespective of on which readout line the pixel exposure position is present).

Figure 15:
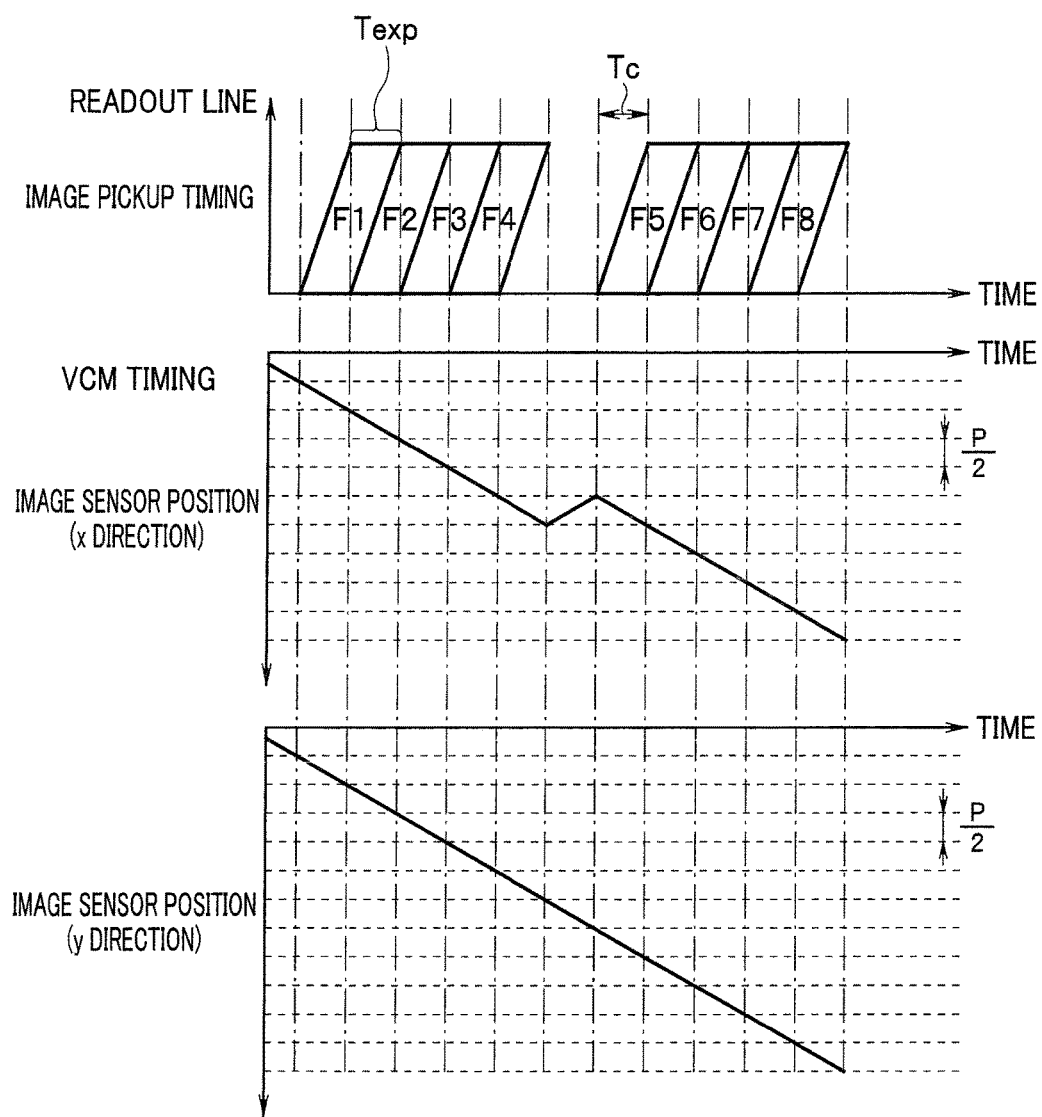
FIG. 15 is a graph showing image pickup timing of the image sensor and driving timings in the x direction and they direction of the image sensor by the voice coil motor (VCM) at the time when the exposure time is equal to the image capturing time in the first embodiment.
Figure 16:
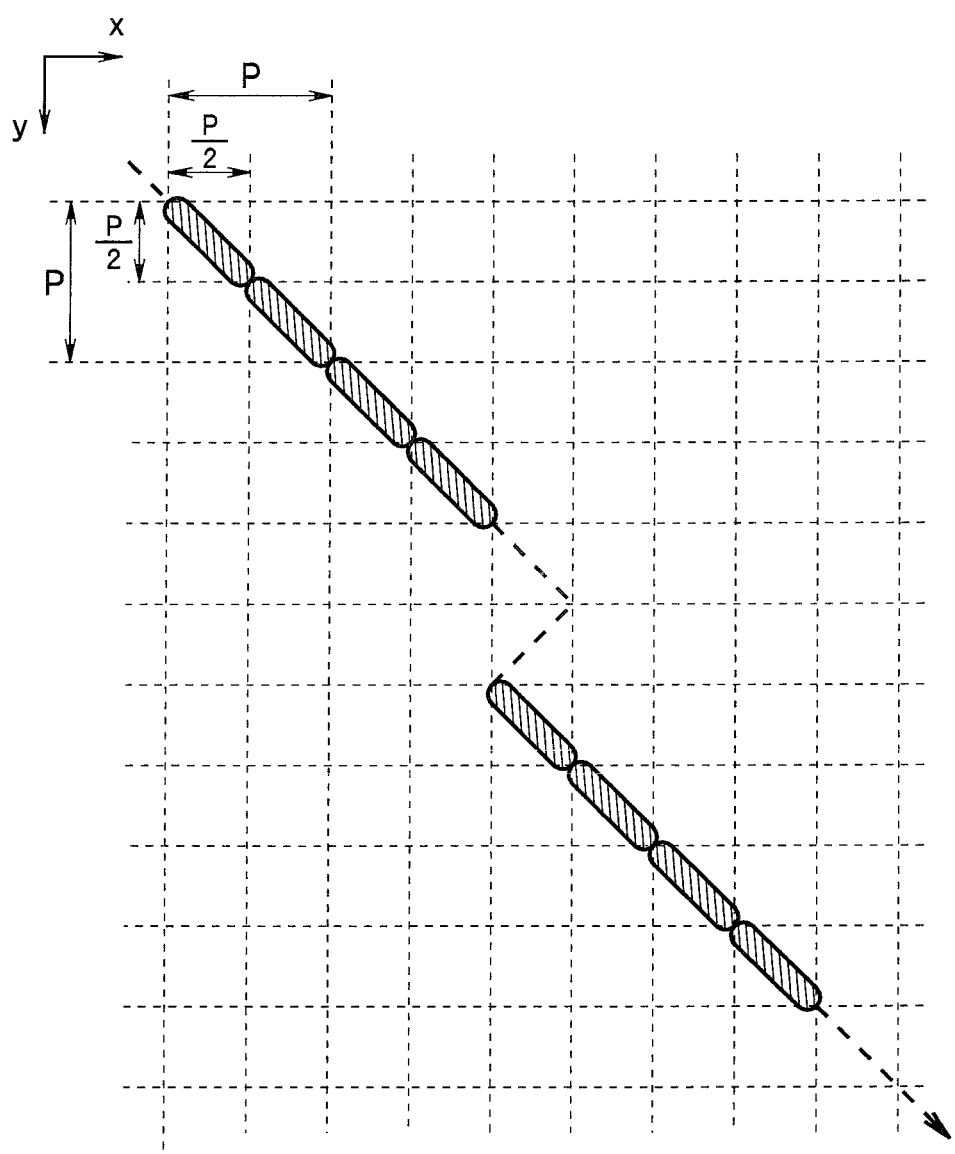
FIG. 16 is a diagram showing pixel exposure positions in respective frames of a line read out first in an image when the exposure time is equal to the image capturing time in the first embodiment.
Figure 17:
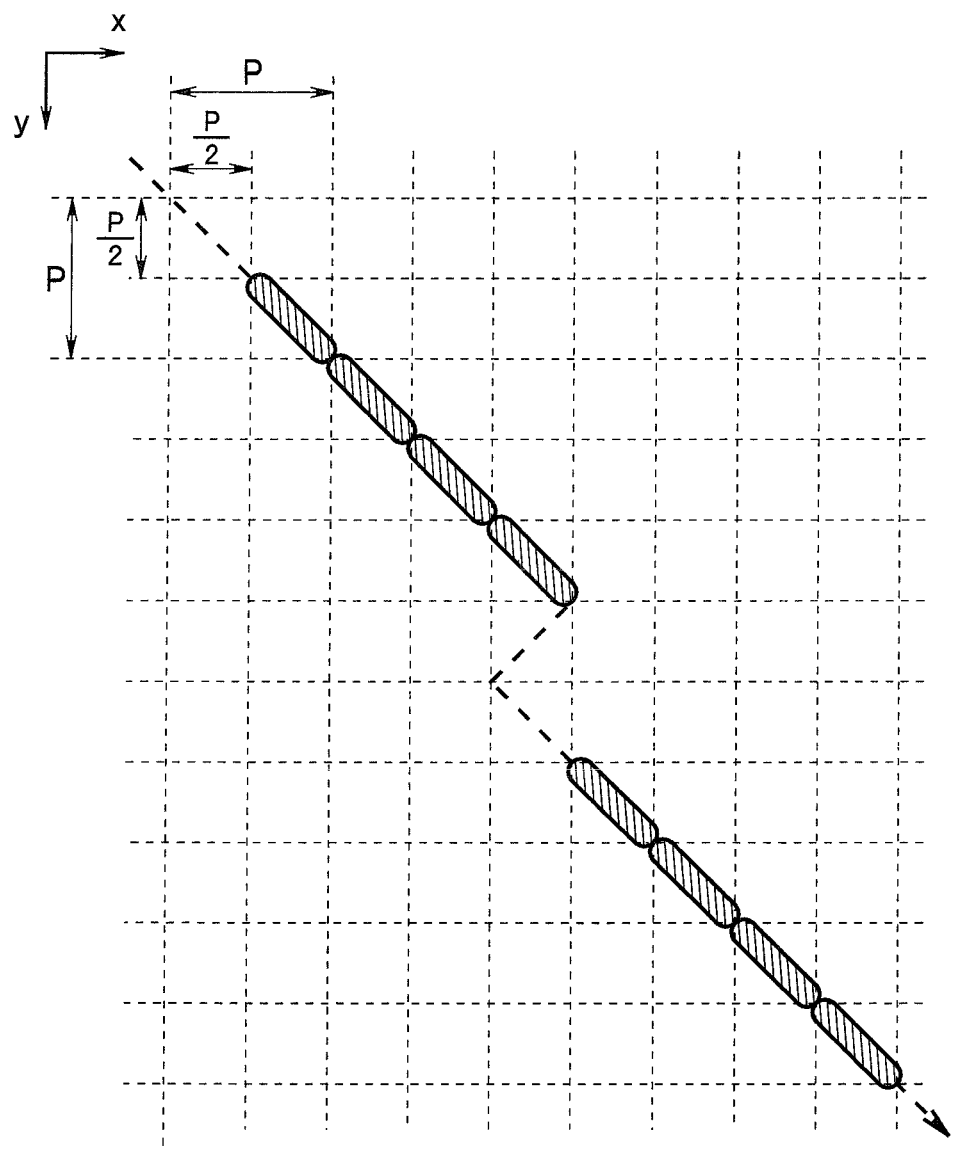
FIG. 17 is a diagram showing pixel exposure positions in respective frames of a line read out last in an image when the exposure time is equal to the image capturing time in the first embodiment.

Exposure on pixels at the time when the exposure time Texp is equal to the image capturing time Tc is explained with reference to FIG. 15 to FIG. 17. FIG. 15 is a graph showing image pickup timing of the image sensor 22 and driving timings in the x direction and they direction of the image sensor 22 by the voice coil motor (VCM) 23 at the time when the exposure time Texp is equal to the image capturing time Tc. FIG. 16 is a diagram showing pixel exposure positions in respective frames of a line read out first in an image when the exposure time Texp is equal to the image capturing time Tc. FIG. 17 is a diagram showing pixel exposure positions in respective frames of a line read out last in an image when the exposure time Texp is equal to the image capturing time Tc.

First, driving timings in the x direction and they direction of the image sensor 22 by the voice coil motor (VCM) 23 are the same as the driving timings in the case shown in FIG. 12.

The image pickup timing of the image sensor 22 is the same as the image pickup timing in the case shown in FIG. 12 except that the exposure time Texp is equal to the image capturing time Tc.

On the other hand, since the exposure time Texp is equal to the image capturing time Tc, pixel exposure positions in adjacent frames are in contact with each other and continuous. The pixel exposure positions can be represented as, for example, linear black long circles having length P/√2 extending along a direction of a dotted line arrow indicating a moving route of the image sensor 22 shown in FIG. 16 and FIG. 17.

Otherwise, the exposure is basically the same as the exposure in the case shown in FIG. 12 to FIG. 14.

Figure 18:
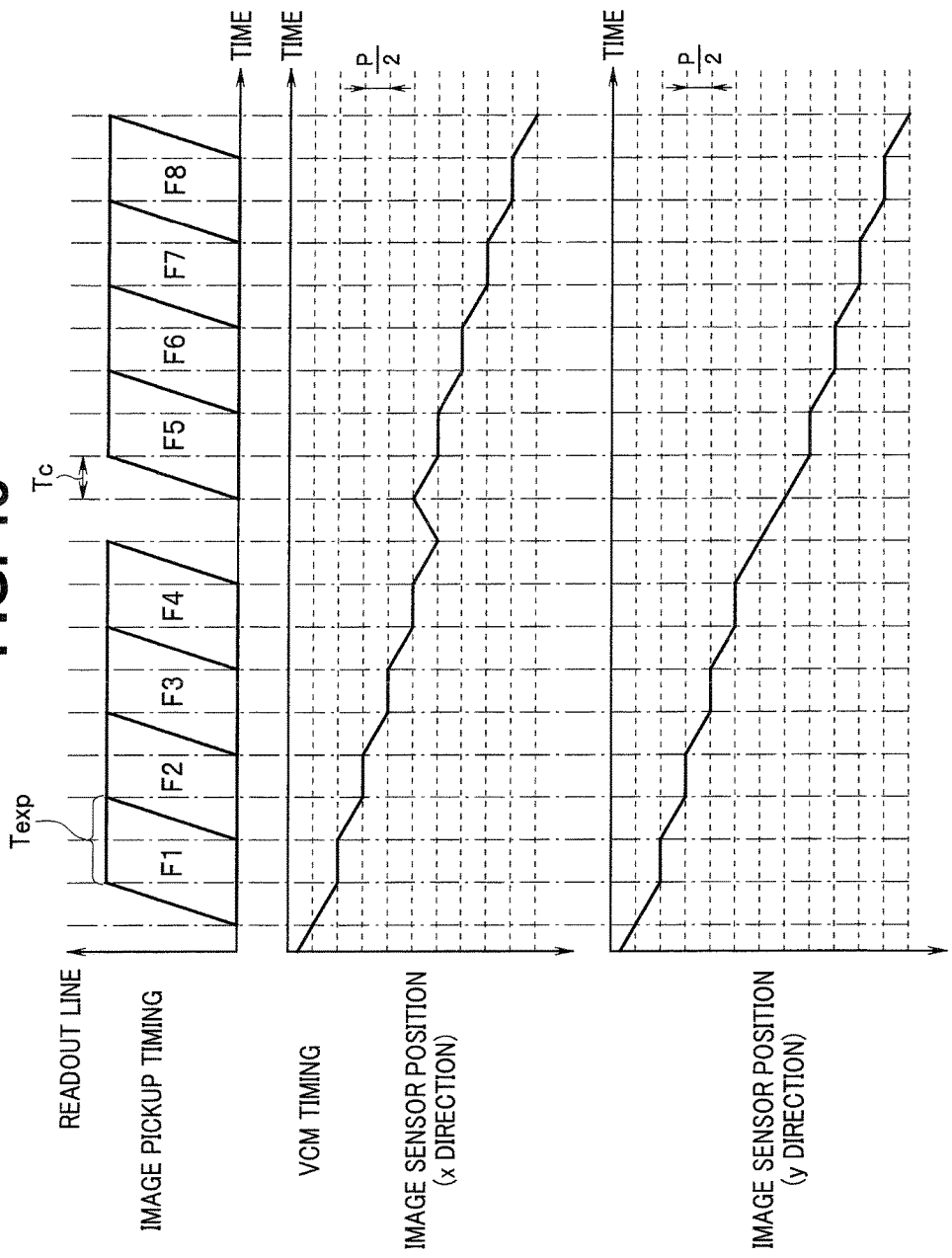
FIG. 18 is a graph showing image pickup timing of the image sensor and the driving timings in the x direction and they direction of the image sensor by the voice coil motor (VCM) at the time when the exposure time is longer than the image capturing time in the first embodiment.
Figure 19:
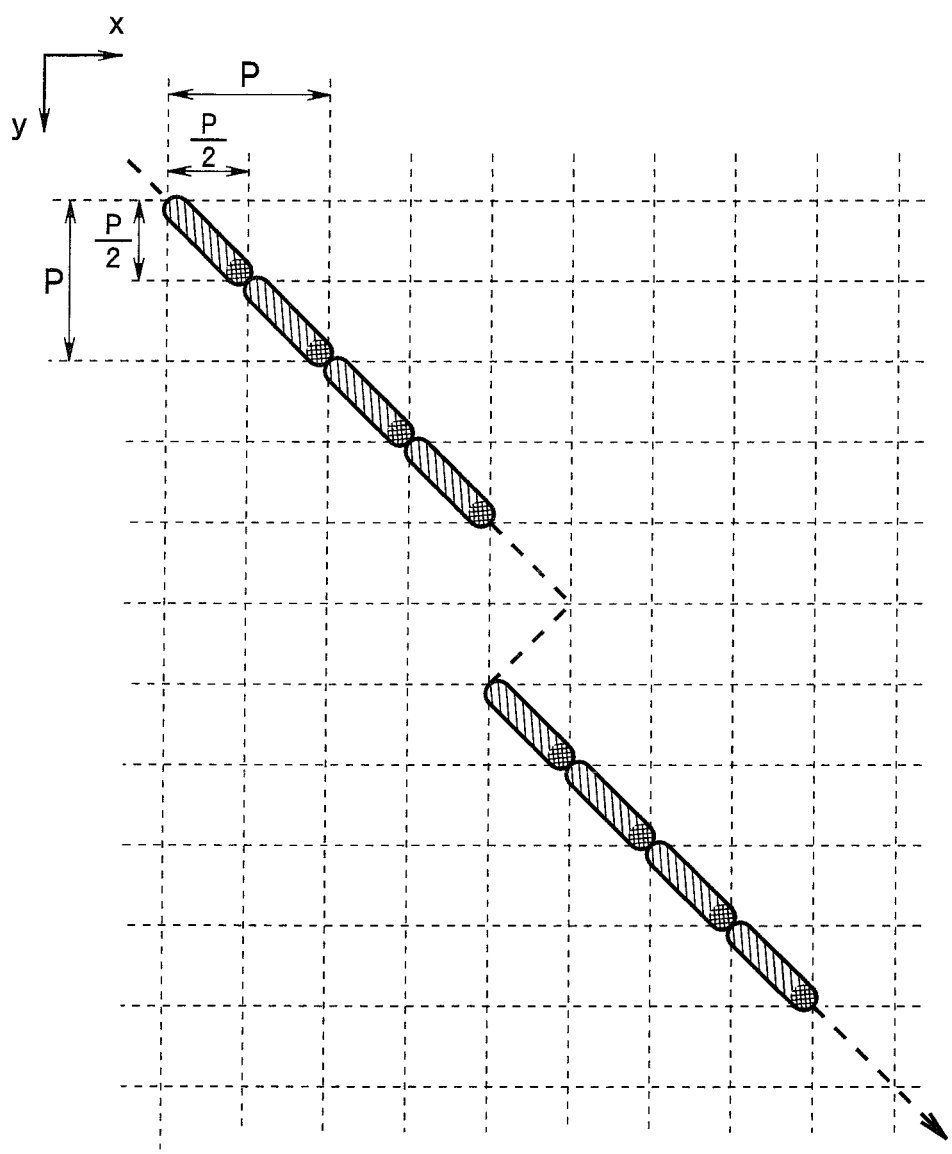
FIG. 19 is a diagram showing pixel exposure positions in respective frames of a line read out first in an image when the exposure time is longer than the image capturing time in the first embodiment.
Figure 20:
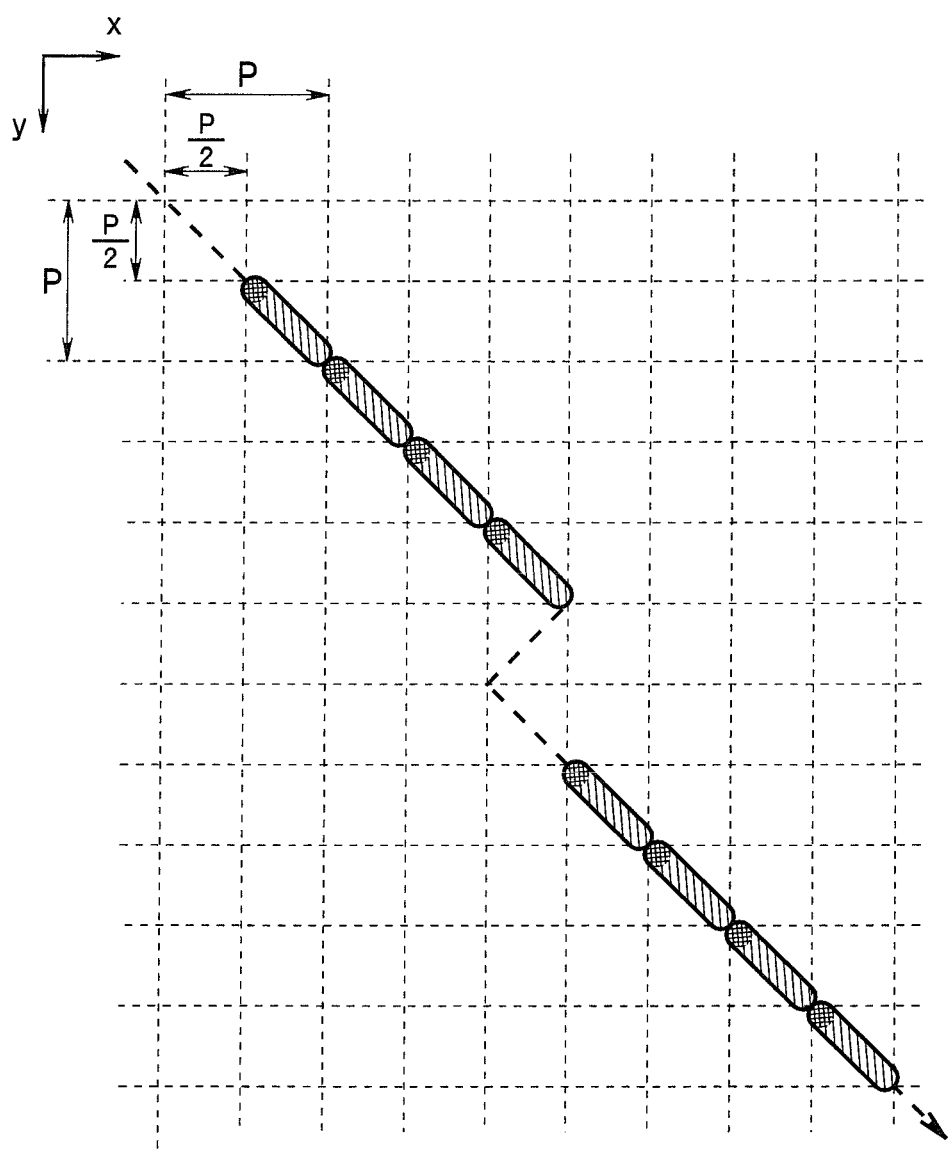
FIG. 20 is a diagram showing pixel exposure positions in respective frames of a line read out last in an image when the exposure time is longer than the image capturing time in the first embodiment.

Subsequently, exposure on pixels at the time when the exposure time Texp is longer than the image capturing time Tc is explained with reference to FIG. 18 to FIG. 20. FIG. 18 is a graph showing image pickup timing of the image sensor 22 and the driving timings in the x direction and they direction of the image sensor 22 by the voice coil motor (VCM) 23 at the time when the exposure time Texp is longer than the image capturing time Tc. FIG. 19 is a diagram showing pixel exposure positions in respective frames of a line read out first in an image when the exposure time Texp is longer than the image capturing time Tc. FIG. 20 is a diagram showing pixel exposure positions in respective frames of a line read out last in an image when the exposure time Texp is longer than the image capturing time Tc.

In FIG. 18 to FIG. 20, an example in which Texp=2×Tc is shown.

In this case, concerning the driving timings in the x direction and the y direction of the image sensor 22 by the voice coil motor (VCM) 23, in the case of the pixel shift speed (P/(2Tc), P/(2Tc)) explained above, the pixel exposure position is moved by (P/2, P/2) at a point in time when a half of the exposure time Texp elapses. Therefore, in a remaining half of the exposure time Texp, (more generally, in a remaining period of (Texp−Tc)), the image sensor 22 is maintained in a fixed position without being moved.

That is, the microcomputer 45, which is the pixel-shift-movement setting section, sets a moving method for relative positions to cause a period in which the movement is stopped during the exposures when the exposure time Texp of one frame is longer than the image capturing time Tc from the image sensor 22.

Such driving is performed respectively in the exposure periods of the first group including the first frame F1 to the fourth frame F4 and the second group including the fifth frame F5 to the eighth frame F8. On the other hand, as explained above, the pixel shift direction is shifted by the magnitude P/√2 in the direction orthogonal to the pixel shift direction between the first group and the second group.

In this case, as in the case shown in FIG. 16 and FIG. 17, pixel exposure positions in adjacent frames are in contact with each other and continuous. The pixel exposure positions can be represented as, for example, linear black long circles having length P/√2 extending along a direction of a dotted line arrow indicating a moving route of the image sensor 22. However, the exposure position is maintained for the period of (Texp−Tc) as explained above at a terminal end of an exposure route indicated by the black long circles. Therefore, an exposure amount in the terminal end portion is larger than exposure amounts in other portions of the exposure route indicated by the black long circles.

Otherwise, the exposure is basically the same as the exposure in the case of FIG. 12 to FIG. 14 or FIG. 15 to FIG. 17.

As it is seen when the exposure positions at the time of Texp<Tc shown in FIG. 12 to FIG. 14, the exposure positions at the time of Texp=Tc shown in FIG. 15 to FIG. 17, and the exposure positions at the time of Texp>Tc shown in FIG. 18 to FIG. 20 are respectively compared, when Texp<Tc, the exposure positions concentrate on a specific position corresponding to length of the exposure time Texp and, when Texp>Tc, the exposure positions concentrate on a terminal end position of the exposure route indicated by the black long circles. On the other hand, when Texp=Tc, the exposure positions uniformly disperse on the exposure route indicated by the black long circles.

Therefore, it is seen that a degree of an image blur that occurs in an image increases as the exposure time Texp increases when Texp<Tc, becomes largest when Texp=Tc, and decreases as the exposure time Texp increases when Texp>Tc.

In order to appropriately correct the image blur, magnitude of which changes, according to the length of the exposure time Texp relative to the image capturing time Tc, the band enhancement parameter α is changed as shown in FIG. 9.

That is, for example, when Texp<Tc, intensity of a band enhancement filter is set relatively low because the exposure positions do not move so much, when Texp=Tc, the intensity of the band enhancement filter is set high because the exposure positions uniformly disperse, and, when Texp>Tc, the intensity of the band enhancement filter is set relatively low because exposure is concentratedly performed in the exposure positions that stop moving.

According to the first embodiment explained above, the exposure is performed during the movement of the relative positions of the light beam and the image sensor 22 to acquire the image data. Therefore, it is possible to reduce a photographing time of a plurality of image data used for combination. The movement of the relative positions during the exposures is set in the same moving direction and the same movement amount. Therefore, it is possible to secure high resolution of combined image data at least in a direction different from the moving direction. In particular, when the exposure time Texp is different from the image capturing time Tc, influence of an image blur in the moving direction also decreases. Therefore, it is possible to achieve high resolution even if band enhancement in the moving direction is not performed.

Further, the band enhancing section 54 enhances, with respect to the combined image data, frequency components in the direction same as the moving direction of the relative positions during the exposures. Therefore, it is possible to reduce the influence of the image blur in the moving direction and obtain an image having higher sharpness and high resolution.

In this case, the band enhancing section 54 changes an enhancement degree of the band enhancement according to the exposure time Texp to maximize the enhancement degree when the exposure time Texp is equal to the image capturing time Tc. Therefore, it is possible to appropriately reduce the influence of the image blur in the moving direction.

When the exposure time Texp is longer than the image capturing time Tc, the moving method for the relative positions is set to cause a period when the movement is stopped during the exposures. Therefore, it is possible to maintain a movement amount of the relative positions in one frame period constant without depending on the length of the exposure time Texp. Further, it is possible to suppress an exposure amount from uniformly dispersing on the exposure route and concentrate the exposure amount in the movement stop position. That is, it is possible to reduce an image blur.

[Second Embodiment]

Figure 21:
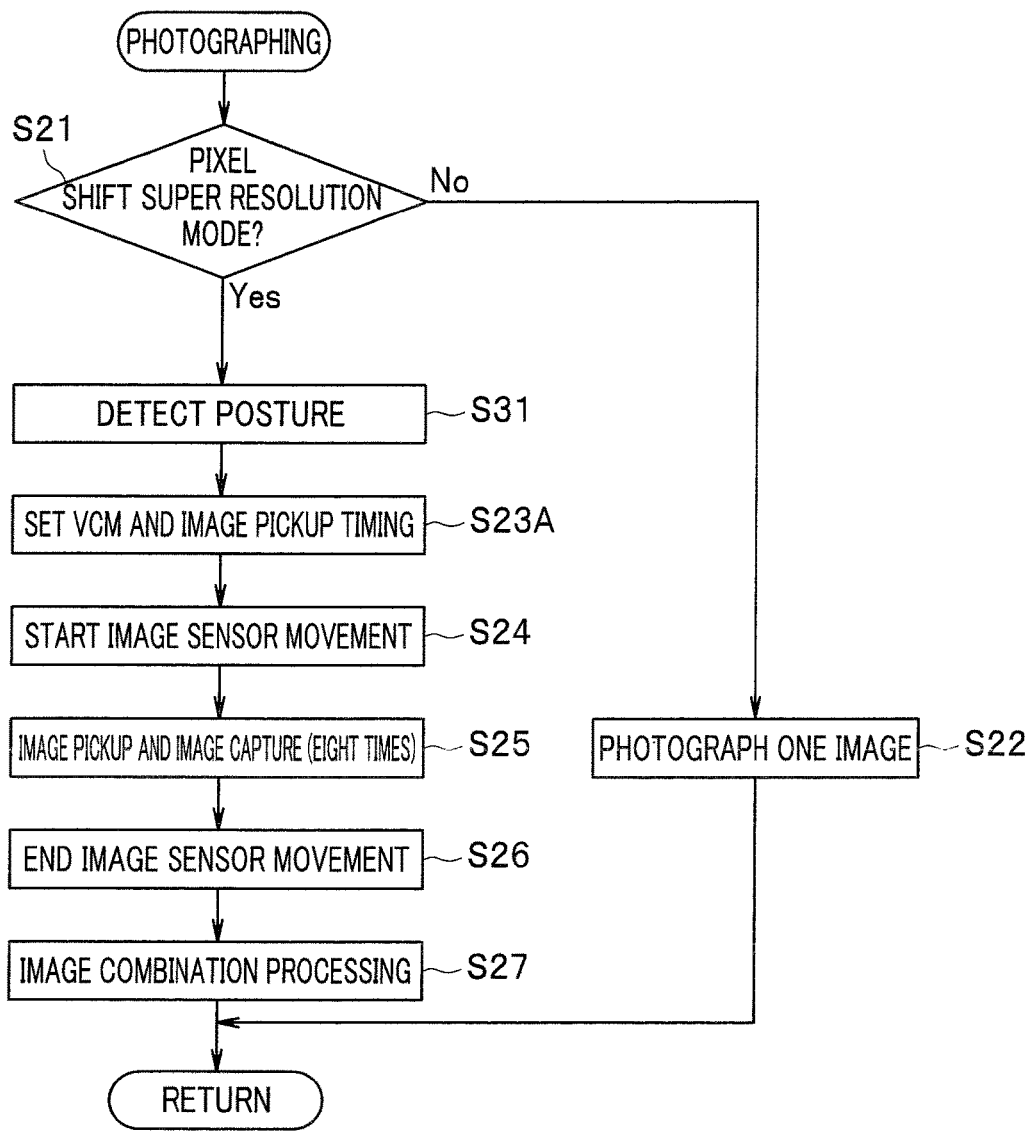
FIG. 21 is a flowchart showing a flow of photographing processing in a digital camera in a second embodiment of the present invention.

FIG. 21 shows a second embodiment of the present invention and is a flowchart showing a flow of photographing processing in a digital camera.

In the second embodiment, explanation of portions same as the portions in the first embodiment is omitted as appropriate by, for example, attaching same reference numerals and signs to the portions. Differences are mainly explained.

Driving of the image sensor 22 by the voice coil motor (VCM) 23 is mechanical. Therefore, the driving is affected by gravity acting on the image sensor 22. Therefore, in the present embodiment, a pixel shift direction is controlled taking into account a direction of the gravity.

That is, when starting the photographing processing shown in FIG. 21, first, the microcomputer 45 performs the processing in step S21 explained above. When it is determined in step S21 that the photographing mode is set in the pixel shift super resolution photographing mode, the microcomputer 45 acquires information in the gravity direction with respect to the image sensor 22 from the posture detecting section 30 and detects a posture of the digital camera (step S31).

The microcomputer 45, which is the pixel-shift-movement setting section, sets a moving method for relative positions, that is, a moving direction and moving speed of the image sensor 22 by the voice coil motor (VCM) 23, image pickup timings of respective images by the image sensor 22, and the like according to the gravity direction detected by the posture detecting section 30 (step S23A).

At this point, the microcomputer 45 sets the moving method for the relative positions to set a moving direction of the relative positions in a direction having a positive component in the gravity direction.

More specifically, the microcomputer 45 sets the pixel shift direction in a direction of a vector (1, 1) or (−1, 1) when the gravity direction is, for example, a −y direction, sets the pixel shift direction in a direction of a vector (1, −1) or a direction of a vector (−1, −1) when the gravity direction is a −y direction, sets the pixel shift direction in a direction of the vector (1, 1) or (1, −1) when the gravity direction is a +x direction, and sets the pixel shift direction in a direction of the vector (−1, −1) or (−1, 1) when the gravity direction is a −x direction. In short, the microcomputer 45 only has to set the pixel shift direction to have a component in a direction same as the gravity direction.

Other processing is the same as the processing shown in FIG. 11 of the first embodiment explained above.

According to such a second embodiment, an effect substantially the same as the effect in the first embodiment is achieved. Further, since the moving method for the relative positions is set to set the moving direction of the relative positions in the direction having the positive component of the gravity direction, it is possible to reduce a load and power consumption of the voice coil motor (VCM) 23.

[Third Embodiment]

Figure 22:
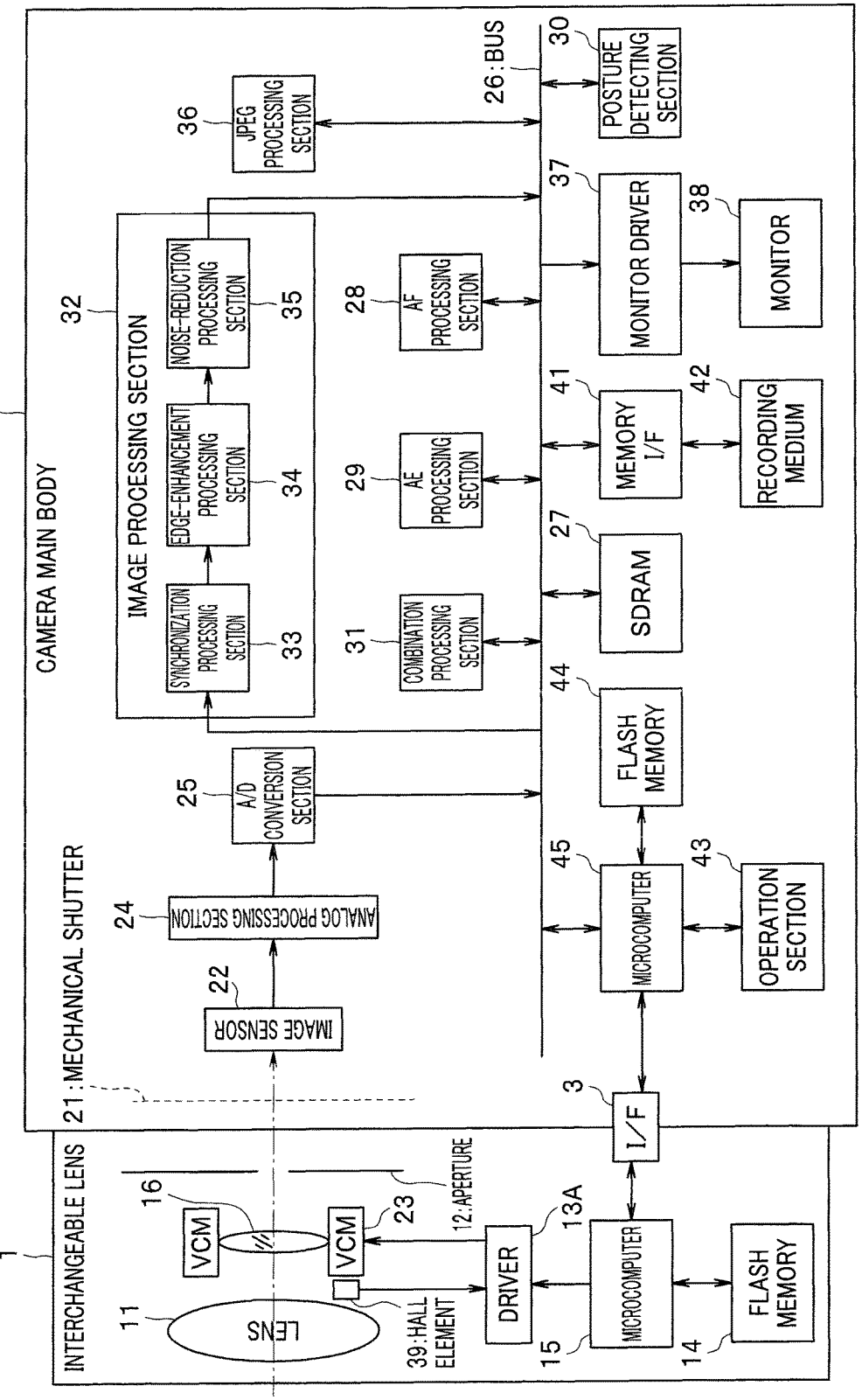
FIG. 22 is a block diagram showing a configuration of a digital camera in a third embodiment of the present invention.

FIG. 22 shows a third embodiment of the present invention and is a block diagram showing a configuration of a digital camera.

In the third embodiment, explanation of portions same as the portions in the first and second embodiments is omitted as appropriate by, for example, attaching same reference numerals and signs to the portions. Differences are mainly explained.

In the configuration example shown in FIG. 1 of the first embodiment, the image sensor 22 is moved in the plane perpendicular to the optical axis of the lens 11 by the voice coil motor (VCM) 23 to perform the pixel shift. However, in the present embodiment, an optical-axis-shift optical element 16 is provided in the interchangeable lens 1. The pixel shift is performed by moving the optical-axis-shift optical element 16.

That is, in the interchangeable lens 1, the lens 11, the aperture 12, the flash memory 14, and the microcomputer 15 are provided. Further, the optical-axis-shift optical element 16, the voice coil motor (VCM) 23, and the Hall element 39 are provided. A driver 13A of the present embodiment performs, in addition to the function of the driver 13 explained above, driving control of the voice coil motor (VCM) 23 on the basis of a detection result of the Hall element 39.

The optical-axis-shift optical element 16 shifts an optical axis of a light beam traveling from the lens 11 to the image sensor 22. It is possible to widely adopt optical-axis-shift optical elements of various schemes (or may be optical-axis-shift optical elements functioning as a so-called optical blur correction mechanism as well) such as a scheme for tilting an optical plate having a predetermined refractive index and predetermined thickness non-perpendicularly to the optical axis to shift the optical axis and adjusting a tilting angle to control a shift amount and a scheme for moving liquid having a predetermined refractive index in a bellows state across two optical plates (in a state in which an optical plate on an incidence side and an optical plate on an emission side are not parallel) to thereby correct the optical axis.

The voice coil motor (VCM) 23 drives the optical-axis-shift optical element 16 to shift the optical axis on the basis of control by the driver 13A.

Further, the Hall element 39 detects a driving position of the optical-axis-shift optical element 16.

In this way, the driver 13A drives the voice coil motor (VCM) 23 while referring to a detection result of the Hall element 39 and controls a shift direction and a shift amount of the optical axis by the optical-axis-shift optical element 16 on the basis of the control by the microcomputer 15 in the interchangeable lens 1 and on the basis of the control by the microcomputer 45 in the camera main body 2.

Note that the configuration of the first embodiment or the second embodiment and the configuration of the third embodiment may be combined to move both of the image sensor 22 and the optical-axis-shift optical element 16 and perform the pixel shift. In this case, the voice coil motor (VCM) 23 configured to move the image sensor 22 and the voice coil motor (VCM) 23 configured to move the optical-axis-shift optical element 16 are provided. Further, the Hall element 39 configured to detect a position of the image sensor 22 and the Hall element 39 configured to detect a position of the optical-axis-shift optical element 16 are provided.

According to such a third embodiment, even when the optical system is moved to perform the pixel shift or when the image sensor 22 and the optical system are moved to perform the pixel shift, an effect substantially the same as the effects in the first and second embodiments can be achieved.

Note that the respective sections explained above may be configured as circuits. Any circuit may be implemented as a single circuit or may be implemented as a circuit obtained by combining a plurality of circuits as long as the circuit can play the same function. Further, any circuit is not limited to be configured as a dedicated circuit for playing a target function and may be configured to play the target function by causing a general-purpose circuit to execute a processing program.

The image pickup apparatus is mainly explained above. However, the present invention may be an image pickup method for performing processing same as the processing of the image pickup apparatus or may be a processing program for causing a computer to execute the image pickup method, a non-transitory recording medium that can be read by the computer and records the processing program, and the like.

The present invention is not limited to the embodiments per se. In an implementation stage, the constituent elements can be modified and embodied in a range not departing from the spirit of the present invention. Modes of various inventions can be formed by appropriate combinations of the plurality of constituent elements disclosed in the respective embodiments. For example, several constituent elements may be deleted from all the constituent elements described in the embodiments. Further, the constituent elements described in different embodiments may be combined as appropriate. In this way, naturally, various modifications and applications are possible within the range not departing from the spirit of the invention.

What is claimed is:

1. An image pickup apparatus comprising:
    an image sensor in which a plurality of pixels are two-dimensionally arrayed at a predetermined pixel pitch;
    a pixel-shift driving mechanism configured to move relative positions of the image sensor and a light beam, which is received by the image sensor, in a direction of the two-dimensional array to set a movement amount of a frame period to a non-integer multiple of the pixel pitch; and
    a processor configured of hardware, the processor being configured to function as:
        an image-pickup control section configured to cause the image sensor to perform exposures a plurality of times during the movement of the relative positions and acquire image data of a plurality of frames; and
        an image combining section configured to combine the image data of the plurality of frames acquired by the image-pickup control section to generate combined image data having higher resolution than the image data obtained from the image sensor, wherein
    the pixel-shift driving mechanism sets the movement of the relative positions during the exposures in a same moving direction and a same movement amount in each of the exposures of the plurality of times.

2. The image pickup apparatus according to claim 1, wherein the image combining section includes a band enhancing section configured to enhance, with respect to the combined image data, a frequency component in a direction same as the moving direction of the relative positions during the exposures.

3. The image pickup apparatus according to claim 2, wherein the band enhancing section changes an enhancement degree of the band enhancement according to an exposure time of one frame to maximize the enhancement degree when the exposure time is equal to an image capturing time from the image sensor.

4. The image pickup apparatus according to claim 1, wherein
    the processor is configured to further function as a pixel-shift-movement setting section configured to set a moving method for the relative positions by the pixel-shift driving mechanism, and
    when an exposure time of one frame is longer than an image capturing time from the image sensor, the pixel-shift-movement setting section sets the moving method for the relative positions to cause a period in which the movement is stopped during the exposures.

5. The image pickup apparatus according to claim 1, wherein
    the processor is configured to further function as a pixel-shift-movement setting section configured to set a moving method for the relative positions by the pixel-shift driving mechanism,
    the image pickup apparatus further comprises a posture detection sensor configured to detect a gravity direction with respect to the image pickup apparatus, and
    the pixel-shift-movement setting section sets the moving method for the relative positions to set a moving direction of the relative positions in a direction having a positive component of the gravity direction detected by the posture detection sensor.

6. The image pickup apparatus of claim 1, wherein the image-pickup control section is configured to cause the image sensor to perform exposures a plurality of times, and wherein each of the plurality of exposures occurs during the movement of the relative positions.

7. The image pickup apparatus of claim 6, wherein the movement of the relative positions imparts a blur to each of the plurality of exposures.

8. An image pickup method comprising:
moving relative positions of an image sensor, in which a plurality of pixels are two-dimensionally arrayed at a predetermined pixel pitch, and a light beam, which is received by the image sensor, in a direction of the two-dimensional array to set a movement amount of a frame period to a non-integer multiple of the pixel pitch;
causing the image sensor to perform exposures a plurality of times during the movement of the relative positions and acquiring image data of a plurality of frames; and
combining the image data of the plurality of frames to generate combined image data having higher resolution than the image data obtained from the image sensor, wherein
the movement of the relative positions during the exposures is set in a same moving direction and a same movement amount in each of the exposures of the plurality of times.

9. A non-transitory computer-readable medium storing a computer program, the computer program causing a computer to execute processing for:
moving relative positions of an image sensor, in which a plurality of pixels are two-dimensionally arrayed at a predetermined pixel pitch, and a light beam, which is received by the image sensor, in a direction of the two-dimensional array to set a movement amount of a frame period to a non-integer multiple of the pixel pitch;
causing the image sensor to perform exposures a plurality of times during the movement of the relative positions and acquiring image data of a plurality of frames; and
combining the image data of the plurality of frames to generate combined image data having higher resolution than the image data obtained from the image sensor, wherein
the movement of the relative positions during the exposures is set in a same moving direction and a same movement amount in each of the exposures of the plurality of times.

* * * * *